(12) United States Patent
Zeng et al.

(10) Patent No.: US 10,229,092 B2
(45) Date of Patent: Mar. 12, 2019

(54) SYSTEMS AND METHODS FOR ROBUST LOW-RANK MATRIX APPROXIMATION

(71) Applicant: City University of Hong Kong, Kowloon (HK)

(72) Inventors: Wen-Jun Zeng, Shek Kip Mei (HK); Hing Cheung So, Kowloon (HK); Jiayi Chen, Shenzhen (CN)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/676,600

(22) Filed: Aug. 14, 2017

(65) Prior Publication Data

US 2019/0050372 A1 Feb. 14, 2019

(51) Int. Cl.
| | | |
|---|---|---|
| H04N 19/10 | (2014.01) | |
| G06F 17/17 | (2006.01) | |
| G06F 7/02 | (2006.01) | |
| G06F 7/76 | (2006.01) | |

(52) U.S. Cl.
CPC ............. G06F 17/17 (2013.01); G06F 7/02 (2013.01); G06F 7/76 (2013.01)

(58) Field of Classification Search
CPC .............. G06F 17/17; G06F 7/02; G06F 7/76
USPC ........................................................ 708/208
See application file for complete search history.

(56) References Cited

U.S. PATENT DOCUMENTS

| | | | |
|---|---|---|---|
| 5,363,858 A | 11/1994 | Farwell | |
| 5,406,956 A | 4/1995 | Farwell | |
| 5,467,777 A | 11/1995 | Farwell | |
| 5,550,928 A | 8/1996 | Lu et al. | |

(Continued)

OTHER PUBLICATIONS

Zeng, W.-J. et al. "$\ell$-MUSIC: Robust Direction-of-Arrival Estimator for Impulsive Noise Environments," IEEE Transactions on Signal Processing, vol. 61, No. 17, pp. 4296-4308, Sep. 2013, 13 pages.

(Continued)

*Primary Examiner* — Tan V Mai
(74) *Attorney, Agent, or Firm* — Norton Rose Fulbright US LLP

(57) ABSTRACT

Systems and methods which provide robust low-rank matrix approximation using low-rank matrix factorization in the $l_p$-norm space, where p<2 (e.g., 1≤p<2), providing a $l_p$-PCA technique are described. For example, embodiments are configured to provide robust low-rank matrix approximation using low-rank matrix factorization in the least absolute deviation ($l_1$-norm) space providing a $l_1$-PCA technique. Embodiments minimize the $l_p$-norm of the residual matrix in the subspace factorization of an observed data matrix, such as to minimize the $l_1$-norm of the residual matrix where p=1. The alternating direction method of multipliers (ADMM) is applied according to embodiments to solve the subspace decomposition of the low-rank matrix factorization with respect to the observed data matrix. Iterations of the ADMM may comprise solving a $l_2$-subspace decomposition and calculating the proximity operator of the $l_1$-norm.

25 Claims, 10 Drawing Sheets

(56) References Cited

U.S. PATENT DOCUMENTS

| | | |
|---|---|---|
| 5,562,596 A | 10/1996 | Pincus et al. |
| 5,743,860 A | 4/1998 | Hively et al. |
| 5,769,793 A | 6/1998 | Pincus et al. |
| 5,846,189 A | 12/1998 | Pincus |
| 5,857,978 A | 1/1999 | Hively et al. |
| 5,892,700 A | 4/1999 | Haardt |
| 5,946,692 A | 8/1999 | Faloutsos et al. |
| 5,963,710 A | 10/1999 | Masumoto |
| 5,967,995 A | 10/1999 | Shusterman et al. |
| 5,983,251 A | 11/1999 | Martens et al. |
| 6,032,146 A | 2/2000 | Chadha et al. |
| 6,044,366 A | 3/2000 | Graffe et al. |
| 6,047,020 A | 4/2000 | Hottinen |
| 6,078,788 A | 6/2000 | Haardt |
| 6,134,555 A | 10/2000 | Chadha et al. |
| 6,157,677 A | 12/2000 | Martens et al. |
| 6,212,526 B1 | 4/2001 | Chaudhuri et al. |
| 6,260,036 B1 | 7/2001 | Almasi et al. |
| 6,278,961 B1 | 8/2001 | Kadtke et al. |
| 6,278,981 B1 | 8/2001 | Dembo et al. |
| 6,295,514 B1 | 9/2001 | Agrafiotis et al. |
| 6,308,094 B1 | 10/2001 | Shusterman et al. |
| 6,311,043 B1 | 10/2001 | Haardt et al. |
| 6,321,216 B1 | 11/2001 | Otte et al. |
| 6,353,731 B1 | 3/2002 | Haardt et al. |
| 6,422,998 B1 | 7/2002 | Vo-Dinh et al. |
| 6,453,246 B1 | 9/2002 | Agrafiotis et al. |
| 6,556,977 B1 | 4/2003 | Lapointe et al. |
| 6,564,176 B2 | 5/2003 | Kadtke et al. |
| 6,571,227 B1 | 5/2003 | Agrafiotis et al. |
| 6,597,678 B1 | 7/2003 | Kuwahara et al. |
| 6,598,014 B1 | 7/2003 | Rabideau et al. |
| 6,629,097 B1 | 9/2003 | Keith |
| 6,675,145 B1 | 1/2004 | Yehia et al. |
| 6,678,669 B2 | 1/2004 | Lapointe et al. |
| 6,732,064 B1 | 5/2004 | Kadtke et al. |
| 6,775,645 B2 | 8/2004 | Daw et al. |
| 6,816,632 B1 | 11/2004 | Slice |
| 6,853,920 B2 | 2/2005 | Hsiung et al. |
| 6,865,509 B1 | 3/2005 | Hsiung et al. |
| 6,873,325 B1 | 3/2005 | Kontkanen et al. |
| 6,889,691 B2 | 5/2005 | Eklund et al. |
| 6,901,351 B2 | 5/2005 | Daw et al. |
| 6,907,270 B1 | 6/2005 | Blanz |
| 6,941,287 B1 | 9/2005 | Vaidyanathan et al. |
| 6,985,779 B2 | 1/2006 | Hsiung et al. |
| 6,993,193 B2 | 1/2006 | Smith |
| 6,993,377 B2 | 1/2006 | Flick et al. |
| 6,993,477 B1 | 1/2006 | Goyal |
| 7,031,778 B2 | 4/2006 | Hsiung et al. |
| 7,039,621 B2 | 5/2006 | Agrafiotis et al. |
| 7,054,757 B2 | 5/2006 | Agrafiotis et al. |
| 7,067,293 B2 | 6/2006 | LaBelle et al. |
| 7,082,321 B2 | 7/2006 | Kuwahara et al. |
| 7,117,187 B2 | 10/2006 | Agrafiotis et al. |
| 7,123,783 B2 | 10/2006 | Gargesha et al. |
| 7,133,860 B2 | 11/2006 | Iizuka et al. |
| 7,139,739 B2 | 11/2006 | Agrafiotis et al. |
| 7,188,055 B2 | 3/2007 | Agrafiotis et al. |
| 7,219,086 B2 | 5/2007 | Geshwind et al. |
| 7,228,244 B2 | 6/2007 | Xin |
| 7,228,295 B2 | 6/2007 | Lapointe et al. |
| 7,269,455 B2 | 9/2007 | Pineda |
| 7,272,530 B2 | 9/2007 | Hsiung et al. |
| 7,299,161 B2 | 11/2007 | Baxter et al. |
| 7,313,447 B2 | 12/2007 | Hsiung et al. |
| 7,353,140 B2 | 4/2008 | Daw et al. |
| 7,353,215 B2 | 4/2008 | Bartlett et al. |
| 7,457,860 B2 | 11/2008 | Shang et al. |
| 7,465,417 B2 | 12/2008 | Hutson et al. |
| 7,475,027 B2 | 1/2009 | Brand |
| 7,499,745 B2 | 3/2009 | Littrup et al. |
| 7,529,991 B2 | 5/2009 | Ide et al. |
| 7,548,651 B2 | 6/2009 | Shozakai et al. |
| 7,562,057 B2 | 7/2009 | Maggioni et al. |
| 7,565,334 B2 | 7/2009 | Rifkin et al. |
| 7,571,084 B2 | 8/2009 | Smith et al. |
| 7,599,898 B2 | 10/2009 | Tesauro et al. |
| 7,603,323 B2 | 10/2009 | Vasilescu |
| 7,617,163 B2 | 11/2009 | Ben-Hur et al. |
| 7,630,992 B2 | 12/2009 | Martin et al. |
| 7,657,626 B1 | 2/2010 | Zwicky |
| 7,673,289 B1 | 3/2010 | Johnson |
| 7,676,442 B2 | 3/2010 | Ben-Hur et al. |
| 7,693,299 B2 | 4/2010 | Vasilescu et al. |
| 7,693,351 B2 | 4/2010 | Sasaki |
| 7,714,782 B2 | 5/2010 | Davis et al. |
| 7,720,013 B1 | 5/2010 | Kelliher et al. |
| 7,725,174 B2 | 5/2010 | Kern et al. |
| 7,728,839 B2 | 6/2010 | Yang et al. |
| 7,734,652 B2 | 6/2010 | Tamayo et al. |
| 7,773,806 B2 | 8/2010 | Cremers et al. |
| 7,788,191 B2 | 8/2010 | Jebara |
| 7,788,193 B2 | 8/2010 | Bartlett et al. |
| 7,788,264 B2 | 8/2010 | Zhu et al. |
| 7,804,062 B2 | 9/2010 | Meija et al. |
| 7,809,660 B2 | 10/2010 | Friedlander et al. |
| 7,853,432 B2 | 12/2010 | Hero, III et al. |
| 7,875,713 B2 | 1/2011 | Keinan |
| 7,907,769 B2 | 3/2011 | Sammak et al. |
| 7,912,561 B2 | 3/2011 | Hsiung et al. |
| 7,912,680 B2 | 3/2011 | Shirakawa |
| 7,930,262 B2 | 4/2011 | Friedlander et al. |
| 7,940,978 B2 | 5/2011 | Rittscher et al. |
| 7,945,061 B1 | 5/2011 | Smith et al. |
| 7,945,570 B2 | 5/2011 | Papadimitriou et al. |
| 7,949,158 B2 | 5/2011 | Lee et al. |
| 7,953,676 B2 | 5/2011 | Agarwal et al. |
| 7,983,874 B2 | 7/2011 | Li et al. |
| 7,996,342 B2 | 8/2011 | Grabarnik et al. |
| 8,046,200 B2 | 10/2011 | Kirby et al. |
| 8,046,317 B2 | 10/2011 | Dasgupta et al. |
| 8,055,603 B2 | 11/2011 | Angell et al. |
| 8,064,697 B2 | 11/2011 | Zhao et al. |
| 8,077,988 B2 | 12/2011 | Donoho |
| 8,095,210 B2 | 1/2012 | Burdick et al. |
| 8,103,543 B1 | 1/2012 | Zwicky |
| 8,112,741 B1 | 2/2012 | Johnson |
| 8,145,582 B2 | 3/2012 | Angell et al. |
| 8,145,677 B2 | 3/2012 | Al-Shameri |
| 8,156,059 B2 | 4/2012 | Dunning et al. |
| 8,159,493 B2 | 4/2012 | Lecerf et al. |
| 8,170,283 B2 | 5/2012 | Cobb et al. |
| 8,180,105 B2 | 5/2012 | Cobb et al. |
| 8,189,900 B2 | 5/2012 | Sammak et al. |
| 8,194,077 B2 | 6/2012 | Lecerf et al. |
| 8,204,315 B2 | 6/2012 | Madabhushi et al. |
| 8,209,269 B2 | 6/2012 | Schoelkopf et al. |
| 8,219,180 B2 | 7/2012 | Cao et al. |
| 8,244,498 B2 | 8/2012 | Wold et al. |
| 8,256,006 B2 | 8/2012 | Grzymala-Busse et al. |
| 8,280,136 B2 | 10/2012 | Gotardo et al. |
| 8,285,719 B1 | 10/2012 | Long et al. |
| 8,295,575 B2 | 10/2012 | Feldman et al. |
| 8,346,688 B2 | 1/2013 | Carroll et al. |
| 8,352,049 B2 | 1/2013 | Hsiung et al. |
| 8,356,086 B2 | 1/2013 | Liu et al. |
| 8,385,663 B2 | 2/2013 | Xu et al. |
| 8,412,651 B2 | 4/2013 | Paiva et al. |
| 8,423,323 B2 | 4/2013 | Bonabeau |
| 8,458,668 B1 | 6/2013 | Johnson |
| 8,463,718 B2 | 6/2013 | Ben-Hur et al. |
| 8,468,189 B2 | 6/2013 | Oktem et al. |
| 8,478,514 B2 | 7/2013 | Kargupta |
| 8,494,222 B2 | 7/2013 | Cobb et al. |
| 8,521,488 B2 | 8/2013 | Kirby et al. |
| 8,606,580 B2 | 12/2013 | Shozakai et al. |
| 8,625,817 B2 | 1/2014 | Barbotin |
| 8,645,440 B2 | 2/2014 | Rosman et al. |
| 8,650,138 B2 | 2/2014 | Mamma et al. |
| 8,655,817 B2 | 2/2014 | Hasey et al. |
| 8,666,677 B2 | 3/2014 | Harynuk et al. |
| 8,676,805 B1 | 3/2014 | Long et al. |
| 8,682,065 B2 | 3/2014 | Wang et al. |

(56) References Cited

U.S. PATENT DOCUMENTS

| | | |
|---|---|---|
| 8,682,718 B2 | 3/2014 | Zwicky |
| 8,706,427 B2 | 4/2014 | Haque et al. |
| 8,725,234 B2 | 5/2014 | Cao et al. |
| 8,732,160 B2 | 5/2014 | Olston |
| 8,745,086 B2 | 6/2014 | Cardno et al. |
| 8,752,181 B2 | 6/2014 | Grzymala-Busse et al. |
| 8,755,837 B2 | 6/2014 | Rhoads et al. |
| 8,758,262 B2 | 6/2014 | Rhee et al. |
| 8,799,202 B2 | 8/2014 | Carroll et al. |
| 8,812,274 B2 | 8/2014 | Virkar et al. |
| 8,849,790 B2 | 9/2014 | Bellare et al. |
| 8,855,431 B2 | 10/2014 | Donoho |
| 8,864,846 B2 | 10/2014 | Herr et al. |
| 8,866,816 B2 | 10/2014 | Cardno |
| 8,886,578 B2 | 11/2014 | Galiana et al. |
| 8,887,286 B2 | 11/2014 | Dupont et al. |
| 8,907,841 B2 | 12/2014 | Sahinoglu et al. |
| 8,914,319 B2 | 12/2014 | Syed et al. |
| 8,972,406 B2 | 3/2015 | Friedlander et al. |
| 8,990,054 B1 | 3/2015 | Ketterling et al. |
| 8,990,135 B2 | 3/2015 | Syed et al. |
| 8,996,528 B1 | 3/2015 | Long et al. |
| 9,002,072 B2 | 4/2015 | Tarnowski et al. |
| 9,015,093 B1 | 4/2015 | Commons |
| 9,032,072 B2 | 5/2015 | Leung et al. |
| 9,043,250 B2 | 5/2015 | Ling et al. |
| 9,051,186 B2 | 6/2015 | Qadri et al. |
| 9,058,695 B2 | 6/2015 | Cardno et al. |
| 9,070,012 B1 | 6/2015 | Sieracki et al. |
| 9,072,482 B2 | 7/2015 | Sarkela et al. |
| 9,084,217 B2 | 7/2015 | Wax et al. |
| 9,105,077 B2 | 8/2015 | Wersborg et al. |
| 9,120,679 B2 | 9/2015 | Qadri et al. |
| 9,152,977 B2 | 10/2015 | Zwicky |
| 9,154,263 B1 | 10/2015 | Muqaibel et al. |
| 9,159,128 B2 | 10/2015 | Madabhushi et al. |
| 9,171,158 B2 | 10/2015 | Akoglu et al. |
| 9,183,512 B2 | 11/2015 | Lehmann et al. |
| 9,208,672 B2 | 12/2015 | Patil et al. |
| 9,217,802 B2 | 12/2015 | Muhl |
| 9,221,177 B2 | 12/2015 | Herr et al. |
| 9,247,139 B2 | 1/2016 | Mansour et al. |
| 9,251,438 B2 | 2/2016 | Lerman et al. |
| 9,251,685 B2 | 2/2016 | Patil et al. |
| 9,299,170 B1 | 3/2016 | Moon et al. |
| 9,312,929 B2 | 4/2016 | Forenza et al. |
| 9,330,342 B2 | 5/2016 | Sarrafzadeh et al. |
| 9,342,991 B2 | 5/2016 | Yang et al. |
| 9,349,200 B2 | 5/2016 | Cardno |
| 9,355,441 B2 | 5/2016 | Wersborg et al. |
| 9,355,482 B2 | 5/2016 | Cardno |
| 9,369,888 B2 | 6/2016 | Forenza et al. |
| 9,372,915 B2 | 6/2016 | Long et al. |
| 9,373,163 B2 | 6/2016 | Wersborg et al. |
| 9,373,330 B2 | 6/2016 | Cumani et al. |
| 9,386,465 B2 | 7/2016 | Forenza et al. |
| 9,413,858 B2 | 8/2016 | Leung et al. |
| 9,430,563 B2 | 8/2016 | Clinchant et al. |
| 9,430,688 B1 | 8/2016 | Ray |
| 9,447,447 B2 | 9/2016 | Yasuda et al. |
| 9,455,763 B2 | 9/2016 | Muqaibel et al. |
| 9,460,400 B2 | 10/2016 | De Bruin et al. |
| 9,460,557 B1 | 10/2016 | Tran et al. |
| 9,508,167 B2 | 11/2016 | Kim et al. |
| 9,519,966 B2 | 12/2016 | Ghouti et al. |
| 9,524,510 B2 | 12/2016 | Jalali et al. |
| 9,535,018 B2 | 1/2017 | Peterlinz et al. |
| 9,539,117 B2 | 1/2017 | Herr et al. |
| 9,542,662 B2 | 1/2017 | Roesch et al. |
| 9,547,316 B2 | 1/2017 | Shilts et al. |
| 9,551,567 B2 | 1/2017 | David et al. |
| 9,558,425 B2 | 1/2017 | Wang et al. |
| 9,558,762 B1 | 1/2017 | Sieracki |
| 9,589,046 B2 | 3/2017 | Akoglu et al. |
| 9,591,028 B2 | 3/2017 | Babb et al. |
| 9,619,814 B2 | 4/2017 | Cardno et al. |
| 9,646,226 B2 | 5/2017 | Wang et al. |
| 9,664,510 B2 | 5/2017 | Nathan et al. |
| 9,674,406 B2 | 6/2017 | Kutz et al. |
| 10,037,437 B1 * | 7/2018 | Kenthapadi ......... G06F 21/6254 |
| 2002/0124035 A1 * | 9/2002 | Faber .................... G06F 17/14 |
| | | 708/400 |
| 2003/0088401 A1 * | 5/2003 | Terez .................... G10L 25/90 |
| | | 704/207 |
| 2007/0217676 A1 * | 9/2007 | Grauman ............. G06K 9/4671 |
| | | 382/170 |
| 2018/0204111 A1 * | 7/2018 | Zadeh .................. G06N 3/0454 |

OTHER PUBLICATIONS

Candes, E.J. et al. "Robust Principal Component Analysis?," Journal of the ACM, vol. 58, No. 3, Article 11: 1-37, May 2011, 37 pages.

Xu, H. et al. "Robust PCA via Outlier Pursuit," IEEE Transactions on Information Theory, vol. 58, No. 5, pp. 3047-3064, May 2012, 18 pages.

Mateos, G. et al. "Robust PCA as Bilinear Decomposition with Outlier-Sparsity Regularization," IEEE Transactions on Signal Processing, vol. 60, No. 10, pp. 5176-5190, Oct. 2012, 15 pages.

* cited by examiner

Input: $M$, rank $r$, and $\mu > 0$

Initialize: $Z^0 = 0$ and $\Lambda^0 = 0$ for $k = 0, 1, 2, \cdots$ do

1) Calculate $X^k = Z^k - \Lambda^k/\mu + M$

2) Compute truncated SVD of $X^k$:

$$\text{TSVD}(X^k) = G_s^k \Sigma_s^k (H_s^k)^H$$

3) Set $U^{k+1} \leftarrow G_s^k$ and $V^{k+1} \leftarrow \Sigma_s^k (H_s^k)^H$

4) Compute $Y^k = U^{k+1} V^{k+1} + \Lambda^k/\mu - M$

5) Update all elements of $Z$ using soft-thresholding:

$$z_{i,j}^{k+1} = \frac{\max(|y_{i,j}^k| - 1/\mu, 0)}{\max(|y_{i,j}^k| - 1/\mu, 0) + 1/\mu} y_{i,j}^k$$

6) $\Lambda^{k+1} = \Lambda^k + \mu (U^{k+1} V^{k+1} - Z^{k+1} - M)$

Stop if termination condition is satisfied.

end for

Output: $(\hat{U}, \hat{V}) = (U^{k+1}, V^{k+1})$

*FIG. 3*

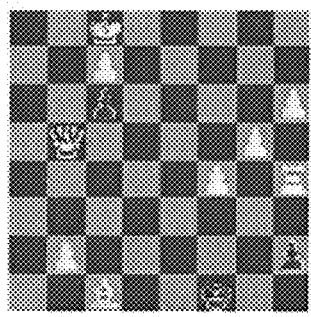 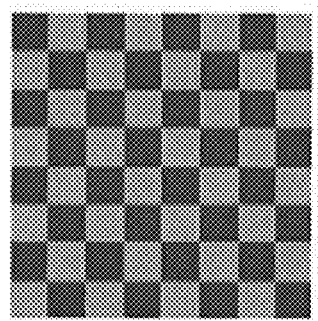 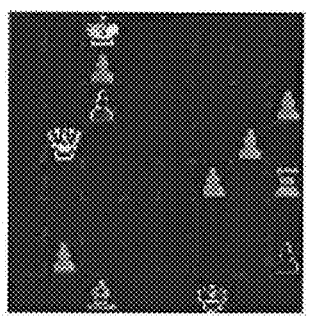
*FIG. 12A*          *FIG. 12B*          *FIG. 12C*

SYSTEMS AND METHODS FOR ROBUST LOW-RANK MATRIX APPROXIMATION

TECHNICAL FIELD

The invention relates generally to extraction of principal components from observed data matrices and, more particularly, to robust low-rank matrix approximation of observed data matrices.

BACKGROUND OF THE INVENTION

Many real-world signals, such as textual, visual, audio, and financial data, lie near some low-dimensional subspace. That is, the matrices constructed using these observations (referred to herein as observed data matrices) as column vectors are often of relatively low rank, and thus data of many such real-world signals can be approximated by matrices whose ranks are much smaller than their column and row lengths (i.e., low-rank matrix approximations of observed data matrices). Accordingly, low-rank matrix approximation, wherein the fit between a given observed data matrix and an approximation matrix is minimized, may be used for mathematical modeling, data compression, etc. with respect to the data of such signals. The purpose of low-rank matrix approximation is to extract the low-dimensional subspaces or principal components of the observed data matrices constructed from the signals. Such low-rank matrix approximation has, for example, been a core task in many important areas including dimensionality reduction, computer vision, machine learning and signal processing, especially with high-dimensional datasets.

Principal component analysis (PCA) is a standard tool to seek the best low-rank representation of a given observation data matrix in the least squares ($l_2$-norm) space. PCA, which can be computed via truncated singular value decomposition (SVD), is a linear transformation that rigidly rotates the coordinates of a given set of data, so as to maximize the variance of the data in each of the new dimensions in succession. As a result, using PCA, it is possible to describe the data in a lower-dimensional space, retaining only the first few principal components, and discarding the rest. However, conventional PCA does not work well in the presence of impulsive noise (e.g., non-Gaussian disturbances) and/or outliers in the observation data matrix. This is because the design of conventional PCA techniques utilizes least squares or the $l_2$-norm minimization with respect to the observation data matrix, and the SVD cannot be generalized to the $l_p$-norm except for p=2, indicating that such conventional PCA (referred to herein as $l_2$-PCA) techniques are well suited only for additive Gaussian noise.

An existing method for robust low-rank matrix approximation is alternating convex optimization (ACO). In the ACO, the objective function is minimized over one factored matrix while the other factor is fixed in an iterative manner. Subspace estimation performance of the ACO is less than desired and computational complexity of the ACO is high. Accordingly, the use of ACO for robust low-rank matrix approximation is unsatisfactory with respect to some scenarios.

As can be appreciated from the foregoing, existing solutions for providing low-rank approximation of observed data matrices, such as PCA, are not robust with respect to impulsive noise and outlier points in the observed data matrix. The existing solutions for providing robust low-rank approximation of observed data matrices, such as ACO, can work in the impulsive noise environments but it is more computationally demanding and have somewhat poor performance in subspace estimation.

BRIEF SUMMARY OF THE INVENTION

The present invention is directed to systems and methods which provide robust low-rank matrix approximation using low-rank matrix factorization in the $l_p$-norm space, where p<2 (e.g., 1≤p<2), (referred to herein as $l_p$-PCA). For example, embodiments are configured to provide robust low-rank matrix approximation using low-rank matrix factorization in the least absolute deviation ($l_1$-norm) space (referred to herein as $l_1$-PCA).

Embodiments of the invention minimize the $l_p$-norm of the residual matrix in the subspace factorization of an observed data matrix. For example, embodiments of a $l_1$-PCA configuration, where p=1, operate to minimize the $l_1$-norm of the residual matrix in the subspace factorization of an observed data matrix, in contrast to the least squares ($l_2$-norm) space factorization and minimization commonly used by PCA (e.g., the aforementioned $l_2$-PCA). The alternating direction method of multipliers (ADMM) is applied according to embodiments to solve the subspace decomposition of the low-rank matrix factorization with respect to the observed data matrix. By way of example, the ADMM may be applied in operation of embodiments of a $l_1$-PCA configuration to solve the $l_1$-norm subspace decomposition of the low-rank matrix factorization with respect to the observed data matrix. Iterations of the ADMM may comprise solving a $l_2$-subspace decomposition (e.g., using the least Frobenius norm solved by the truncated SVD) and calculating the proximity operator of the $l_1$-norm (e.g., using a closed-form soft-thresholding operator for complex variables).

As can be seen from the foregoing, embodiments of the present invention implement a $l_p$-PCA (e.g., a least absolute deviation or $l_1$-norm PCA) technique for low-rank matrix approximation of observed data matrices. Implementations of such a $l_p$-PCA technique may utilize a user-defined parameter in the form of the target rank of the low-rank matrix component. Such a target rank of the low-rank matrix component is generally readily determinable in practical applications (e.g., video surveillance, machine learning, web search, bioinformatics, dimensionality reduction, signal processing, etc.).

It should be appreciated that the low-rank matrix approximations provided using $l_p$-PCA techniques of embodiments are robust with respect to impulsive noise and outlier points in the observed data matrix in light of the $l_p$-norm space, where p<2, of the low-rank matrix factorization of a $l_p$-PCA technique being resistant to impulsive noise and outliers. Moreover, the application of ADMM to solve the $l_p$-norm subspace decomposition according to embodiments of a $l_p$-PCA technique improves the numerical performance compared with the alternating minimization (e.g., ACO providing minimization of an objective function over one factored matrix while another factor is fixed). The low-rank matrix factorization of a $l_p$-PCA technique of the present invention is superior to the ACO in terms of robust subspace estimation performance and computational complexity. For example, a $l_1$-PCA technique of embodiments converges to a superior solution that has smaller objective function value and more accurate subspace estimation than that of the conventional ACO technique.

Embodiments of the present invention provide a number of advantages over existing low-rank matrix approximation technologies, such as the aforementioned $l_2$-PCA technique.

For example, embodiments provide a matrix factorization approach configured for low-rank matrix approximation in the presence of impulsive noise, outliers, anomalies, or sparse features. The robust $l_p$-norm minimization utilized according to embodiments of a $l_p$-PCA technique herein works well in such environments while the conventional $l_2$-PCA techniques, including, the PCA which is based on $l_2$-norm minimization, fail to operate. The use of ADMM for solving the subspace decomposition according to $l_p$-PCA embodiments, provides superior comparative performance which is demonstrated via the application of source localization in impulsive noise environment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 3 shows pseudocode providing logic implementing the ADMM of a $l_p$-PCA technique for low-rank matrix approximation according to embodiments of the invention;

FIGS. 12A-12C show results of a $l_p$-PCA technique employed in the application of texture impainting.

DETAILED DESCRIPTION OF THE INVENTION

Observed data may be represented as the matrix $M \in \mathbb{C}^{n_1 \times n_2}$. For example, the matrix M may comprise a matrix of a plurality of data points (e.g., one per row), a single object (e.g., a rectangular image with the matrix entries being pixel intensities), etc. Low-rank matrix approximation provides a lossy, compressed version of the observed data matrix. Such low-rank matrix approximation may, for example, be utilized in many application areas, such as dimensionality reduction, computer vision, machine learning, signal processing, etc.

Embodiments of the present invention implement low-rank matrix factorization in the $l_p$-norm space (i.e., function spaces defined using a natural generalization of the p-norm for finite-dimensional vector spaces), where p<2 (e.g., 1≤p<2), (referred to herein as $l_p$-PCA, it being understood that $l_p$-PCA as used herein refers to cases that employ the $l_p$-norm cost function with p<2) for providing robust low-rank matrix approximation. For example, where p=1, embodiments implement a least absolute deviation or $l_1$-norm PCA (referred to herein as $l_1$-PCA) technique for low-rank matrix approximation of observed data matrices. A $l_p$-PCA technique for low-rank matrix approximation of observed data matrices of embodiments herein is configured to extract the low-rank matrix or principal components from an observed data matrix, possibly with impulsive noise, outliers, or sparse features.

In operation according to embodiments, a $l_p$-PCA technique for low-rank matrix approximation of observed data matrices provides the low-rank matrix approximation using low-rank matrix factorization in the subspace by minimizing the $l_p$-norm of the residual matrix in the subspace factorization of an observed data matrix. For example, embodiments of a $l_1$-PCA configuration, where p=1, operate to minimize the $l_1$-norm of the residual matrix in the subspace factorization of an observed data matrix. The alternating direction method of multipliers (ADMM) is applied according to embodiments to solve the subspace decomposition of the low-rank matrix factorization with respect to the observed data matrix, such as to solve the $l_1$-norm subspace decomposition of the low-rank matrix factorization with respect to the observed data matrix in a $l_1$-PCA configuration where p=1. The ADMM technique implemented in accordance with embodiments converts the minimization of a nonsmooth $l_p$-norm into a Frobenius norm minimization at each iteration, such as may be efficiently solved by the truncated SVD. Accordingly, iterations of the ADMM may comprise solving a $l_2$-subspace decomposition and calculating the proximity operator of the $l_p$-norm.

Figure 1:
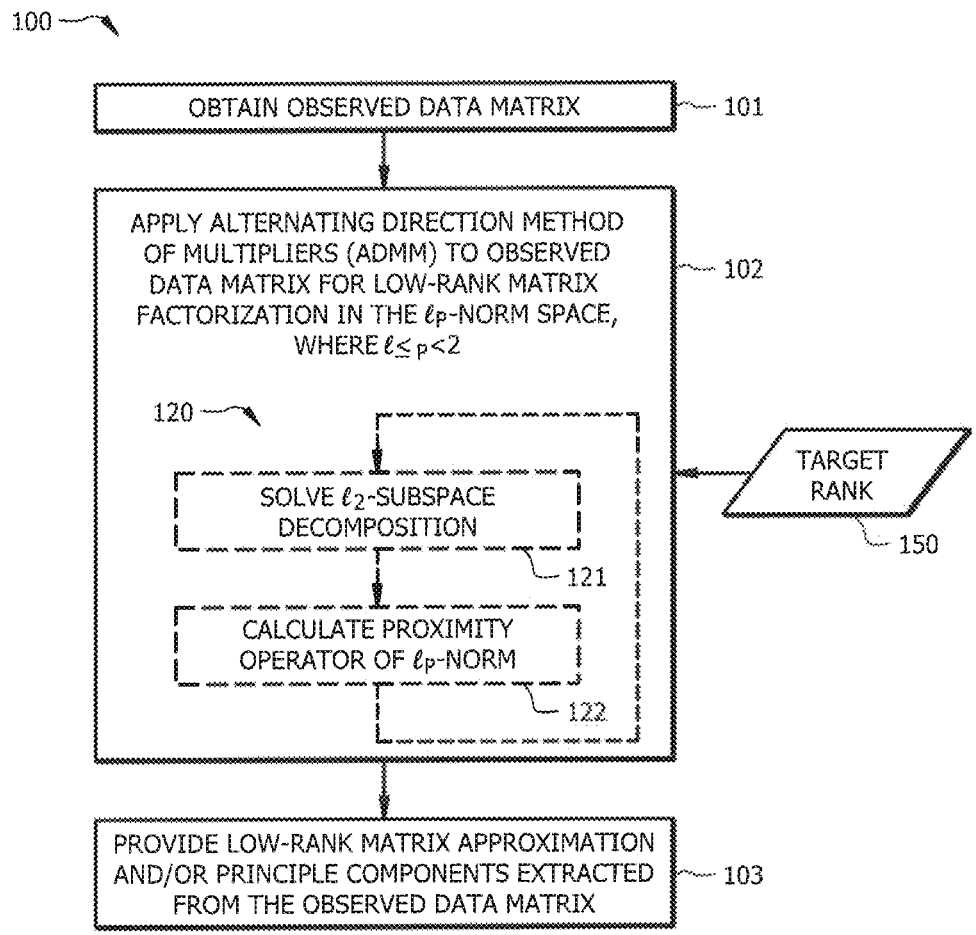
FIG. 1 shows a flow diagram illustrating operation according to a $l_p$-PCA technique for low-rank matrix approximation of observed data matrices according to embodiments of the invention.
Figure 2:
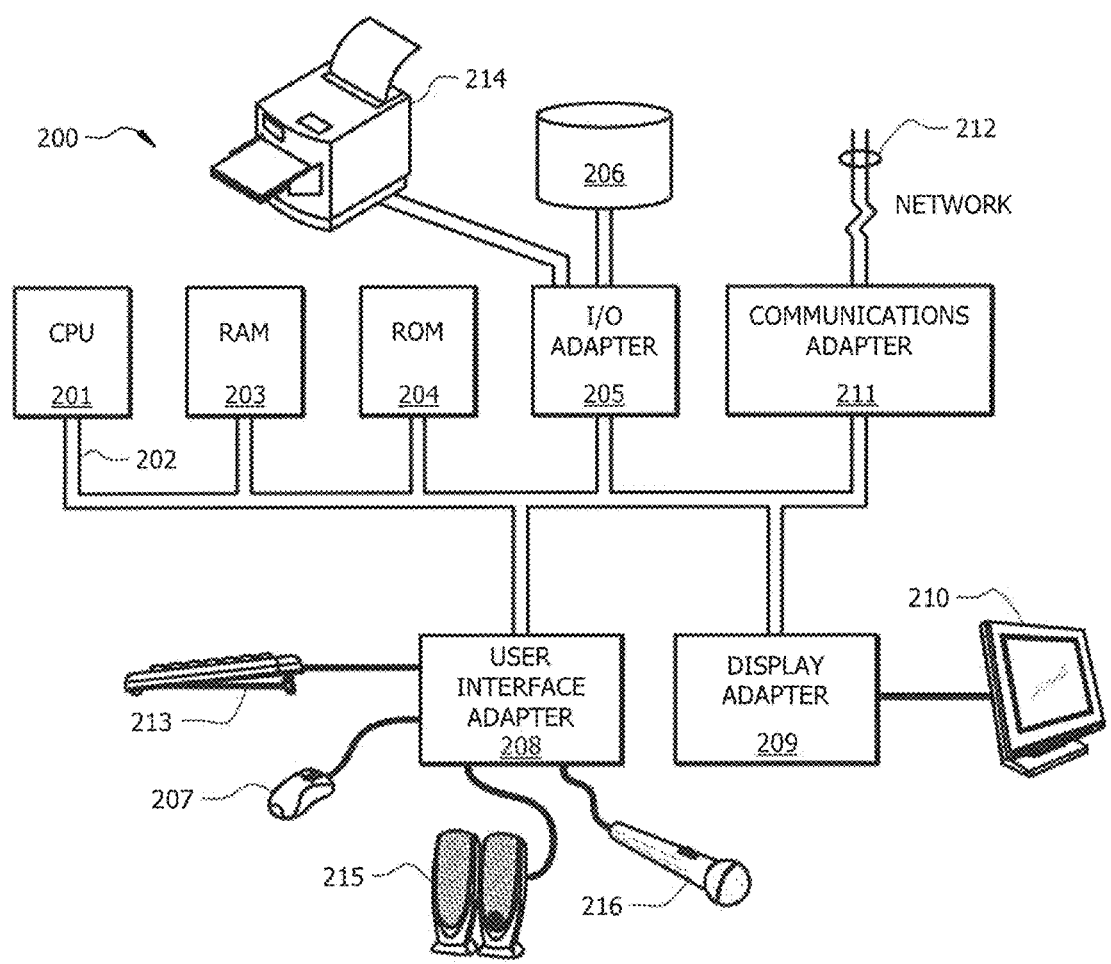
FIG. 2 shows a processor-based system configured for implementing a $l_p$-PCA technique of embodiments of the invention.

FIG. 1 shows a flow diagram illustrating operation according to a $l_p$-PCA technique for low-rank matrix approximation of observed data matrices according to an exemplary embodiment of the invention. The functions of flow 100 setting forth a $l_p$-PCA technique for low-rank matrix approximation of the embodiment illustrated in FIG. 1 may, for example, comprise logic implemented by operation of a processor-based system, such as computer system 200 of FIG. 2. As one example, functions of flow 100 may be provided as processor executable instructions stored in memory which, when executed by a processor, perform operations as described herein. Accordingly, computer system 200 executing instructions of the functions of flow 100 provides a processor-based system configured for $l_p$-PCA low-rank matrix approximation according to embodiments of the present invention.

Computer system 200 may, for example, comprise a server system, a personal computer, a laptop computer, a notebook computer, a tablet device, a smartphone, a personal digital assistant, an Internet of Things (IoT) device, or other processor-based platform having sufficient processing power and resources for implementing functions of a $l_p$-PCA technique for low-rank matrix approximation of embodiments herein. Accordingly, computer system 200 of the illustrated embodiment includes central processing unit (CPU) 201 coupled to system bus 202. CPU 201 may be any general purpose CPU, such as a processor from the PENTIUM or CORE family of processors available from Intel Corporation or a processor from the POWERPC family of processors available from the AIM alliance (Apple Inc., International Business Machines Corporation, and Motorola Inc.). However, the present invention is not restricted by the architecture of CPU 201 as long as CPU 201 supports the inventive operations as described herein.

Bus 202 of the illustrated embodiment is coupled to random access memory (RAM) 203, such as may comprise SRAM, DRAM, SDRAM, flash memory, and/or the like. Read only memory (ROM) 204, such as may comprise PROM, EPROM, EEPROM, and/or the like, is also coupled to bus 202 of the illustrated embodiment. RAM 203 and ROM 204 hold user and system data and programs as is well known in the art. Bus 202 is also coupled to input/output (I/O) controller 205, communications adapter 211, user interface adapter 208, and display adapter 209.

I/O controller 205 connects to storage device 206, such as may comprise one or more of a hard disk, an optical disk (e.g., compact disk (CD) or digital versatile disk (DVD)), a floppy disk, and a tape, to the computer system. I/O controller 205 of the illustrated embodiment is also connected to printer 214, which would allow the system to print information such as documents, photographs, etc. Such a printer may be a traditional printer (e.g., dot matrix, laser, etc.), a fax machine, a copy machine, and/or the like.

Communications adapter 211 is adapted to couple computer system 200 to network 212 to provide communications to and/or from external systems, devices, networks, etc. Network 212 may comprise the public switched telephone network (PSTN), a local area network (LAN), a metropolitan area network (MAN), a wide area network (WAN), an extranet, as intranet, the Internet, a cellular network, a cable transmission network, and/or the like.

User interface adapter 208 of the illustrated embodiment couples various user input devices to the computer system. For example, keyboard 213, pointing device 207, and microphone 216 may be coupled through user interface adapter to accept various forms of user input. Similarly, speakers 215 may be coupled through user interface adapter to provide user interface output.

The display adapter 209 provides an interface to display 210. Accordingly, CPU 201 may control display of various information, including text, graphics, and images upon display 210 through display adapter 209. Display 210 may comprise a cathode ray tube (CRT) display, a plasma display, a liquid crystal display (LCD), a touch screen, a projector, and/or the like. Although not expressly shown in the illustrated embodiment, display 210 may provide for input of data as well as output of data. For example, display 210 may comprise a touch screen display according to embodiments of the invention.

When implemented in software, elements of embodiments of the present invention are essentially code segments operable upon a computer system, such as computer system 200, to perform the necessary tasks. The program or code segments can be stored in a computer readable medium, such as RAM 203, ROM 204, and/or storage device 206. Additionally or alternatively, the code segments may be downloaded via computer networks, such as network 212.

Referring again to FIG. 1, flow 100 of the illustrated embodiment provides robust low-rank matrix approximation of an observed data matrix using low-rank matrix factorization in the $l_p$-norm space, where p<2 (e.g., 1≤p<2). Accordingly, at block 101 of flow 100 the data of an observed data matrix for which low-rank matrix approximation is to be provided are obtained. The observed data matrix may, for example, be derived from various signals, such as textual, graphical, audio, video, multimedia, financial data, etc., wherein the observed data matrix comprises a matrix of a plurality of data points (e.g., one per row) representing the signal. Additionally or alternatively, the observed data matrix may be derived from an object, such as a rectangular image where the matrix entries represent pixels of the image. Irrespective of the particular source and type of data of the observed data matrix, the data of embodiments are such that they are desirable to be approximated by a low-rank matrix and/or to extract principal components from the data, such as in association with video surveillance, machine learning, web search, bioinformatics, dimensionality reduction, signal processing, etc.

Accordingly, block 102 of the illustrated embodiment provides low-rank matrix approximation of the observed data matrix using low-rank matrix factorization in $l_p$-norm space, where p<2. The low-rank matrix approximations provided using $l_p$-PCA techniques implementing low-rank matrix factorization in $l_p$-norm space in accordance with block 102 of the illustrated embodiment are robust with respect to impulsive noise and outlier points in the observed data matrix.

In an exemplary embodiment using low-rank matrix factorization in $l_p$-norm space in operation according to block 102, p=1 and the low-rank matrix factorization is realized in the $l_1$-space. In operation according to embodiments, minimization of the residual matrix in the subspace factorization of an observed data matrix may be implemented by application of the ADMM to the observed data matrix. In facilitating a $l_p$-PCA technique for low-rank matrix approximation by application of the ADMM to the observed data matrix, embodiments utilize a predetermined target rank for the low-rank matrix component. Accordingly, target rank 150, such as may comprise a user-defined parameter determined based upon the particular application in which the low-rank matrix approximation is being provided, may be provided for use in the low-rank matrix factorization in $l_p$-norm space (e.g., for finding the low-rank matrix approximation given the observed data matrix and the target rank for the low-rank matrix approximation).

For the case of $1<p<2$, exemplary embodiments using low-rank matrix factorization in $l_p$-norm space in operation according to block 102 compute the proximity operator of the pth power of the $l_p$-norm. This problem is separable and can be decomposed into $n_1 n_2$ independent scalar minimization problems as follows:

$$\min_z g(z) := \frac{1}{2}|z-y|^2 + \frac{1}{\mu}|z|^p. \tag{1}$$

It should be appreciated that in equation (1) above subscripts and superscripts are omitted for presentation simplicity. For the complex-valued case, the scalar minimization problem, as set forth in equation (1), is a two-dimensional optimization problem, which needs to resort the gradient descent. That is, z may be updated by $z \leftarrow z - s\nabla g(z)$, where s is the step size which can be determined using a line search procedure and $$\nabla g(z) = |z-y| + \frac{pz}{\mu}|z|^{p-2}.$$

The gradient descent iterative procedure is more time-consuming than embodiments in which p=1.

The ADMM may use iterative steps for providing minimization of the $l_p$-norm of the residual matrix in the subspace factorization, as shown by iteration loop 120 in block 102 of the exemplary embodiment. In operation according to an embodiment implementing iteration loop 120, each iteration of the ADMM comprises solving a $l_2$-subspace decomposition, such as by using the least Frobenius norm solved by the truncated SVD, at block 121. Each iteration of the ADMM implementing iteration loop 120 further comprises calculating the proximity operator of the $l_p$-norm, such as by using a closed-form soft-thresholding operator for complex variables at block 122.

Having approximated the observed data matrix by deriving a corresponding low-rank matrix estimate of the observed data matrix at block 102, processing according to the illustrated embodiment of flow 100 proceeds to block 103 wherein the low-rank matrix approximation and/or principal components of the observed data matrix, as may be readily extracted from the low-rank matrix approximation, are provided for use in a particular application. For example, once the ADMM converges upon a solution for the subspace estimation, the results may be provided to one or more process of computer system 200 for use in one or more applications, such as surveillance, machine learning, web search, bioinformatics, dimensionality reduction, signal processing, etc. Additionally or alternatively, the results may be output, such as to an external system or a user, for ultimate consumption.

It should be appreciated that operation of a processor-based system, such as computer system 200, configured for low-rank matrix approximation in the $l_p$-norm space, where $p<2$, (e.g., $l_1$-PCA) according to embodiments of the present invention is improved as compared to operation of a processor-based system configured for conventional $l_2$-PCA low-rank matrix approximation. In particular, a processor-based system configured for low-rank matrix approximation in the $l_p$-norm space, where $p<2$, in accordance with embodiments herein provide a matrix factorization configuration for low-rank matrix approximation in the presence of impulsive noise, outliers, anomalies, and/or sparse features. Accordingly, embodiments of processor-based systems configured for low-rank matrix approximation in the $l_p$-norm space, where $p<2$, are operable to compute more accurate subspace estimation that is robust with respect to impulsive noise, outlier points, anomalies, and/or sparse features in the observed data matrix (i.e., resistant to errors in the resulting estimation due to impulsive noise, outlier points, anomalies, and/or sparse features). Moreover, a processor-based system configured for low-rank matrix approximation in the $l_p$-norm space, where p=1, (i.e., $l_1$-PCA) in accordance with embodiments herein using the ADMM to solve the $l_1$-norm subspace decomposition significantly improves the numerical performance compared with the ACO technique. Further, the computational cost and complexity of the computations performed in the $l_1$-PCA technique implemented by a processor-based system configured in accordance with the concepts herein is much less than that required for the ACO technique.

Having described embodiments configured for low-rank matrix approximation of observed data matrices in the $l_p$-norm space, where $p<2$, (e.g., $l_1$-PCA), further details with respect to concepts employed by a $l_p$-PCA technique providing the low-rank matrix approximation using low-rank matrix factorization in the $l_p$-norm space are provided below. In understanding implementation of a $l_p$-PCA technique for low-rank matrix approximation of observed data matrices, such as in accordance with flow 100 of the exemplary embodiment of FIG. 1, it should be understood that the aforementioned observed data matrix form $M \in \mathbb{C}^{n_1 \times n_2}$ may be factored as:

$$M = L = Q, \tag{2}$$

where L is the low-rank matrix component having rank $(L) = r \ll \min(n_1, n_2)$ and Q is the perturbation matrix which may contain additive disturbances possibly with outlier values.

Accordingly, low-rank matrix approximation may be recast as the task of finding L given M and r.

The low-rank matrix L has low rank, and thus may be rewritten as:

$$L = UV, \tag{3}$$

where U is an $n_1 \times r$ matrix represented as $U \in \mathbb{C}^{n_1 \times r}$ and V is an $r \times n_2$ matrix represented as $V \in \mathbb{C}^{r \times n_2}$. Conventionally, U and V are estimated from the following squared error minimization:

$$\min_{U,V} f_2(U, V) := \|UV - M\|_F^2 \tag{4}$$

where $$\|M\|_F = \left(\sum_{i=1}^{n_1} \sum_{j=1}^{n_2} |m_{i,j}|^2\right)^{1/2} \tag{5}$$

is the Frobenius norm of M with $m_{i,j}$ being its (i, j) entry. When all elements in Q are zero-mean white Gaussian variables, the Frobenius norm minimization in equation (4) results in the maximum likelihood (ML) estimates of U and V.

According to the Eckart-Young theorem, the global solution of equation (4) can be obtained via the truncated SVD of M, although the objective function $f_2(U, V)$ is nonconvex with respect to both U and V. Without loss of generality, assuming that $n_2 \geq n_1$, the SVD of M may be expressed as:

$$M = G\Sigma H^H, \quad (6)$$

where $G=[g_1 \ g_2 \ \ldots \ g_{n_1}] \in \mathbb{C}^{n_1 \times n_1}$ and $H=[h_1 \ h_2 \ \ldots \ h_{n_2}] \in \mathbb{C}^{n_2 \times n_2}$ are orthonormal matrices (i.e., the columns or rows of the matrices are orthonormal vectors) whose columns are the corresponding left and right singular vectors of M, respectively, while $\Sigma = \text{diag}(\lambda_1, \lambda_2, \ldots, \lambda_{n_1}) \in \mathbb{C}^{n_1 \times n_1}$ is the diagonal matrix of singular values of M with $\lambda_1 \geq \lambda_2 \geq \ldots \geq \lambda_{n_1}$. The maximum-likelihood (ML) estimates of U and V, denoted by $\hat{U}$ and $\hat{V}$, are given by:

$$\hat{U} = G_s, \ \hat{V} = \Sigma_s H_s^H, \quad (7)$$

where $G_s=[g_1 \ g_2 \ \ldots \ g_r] \in \mathbb{C}^{n_1 \times r}$, $\Sigma_s = \text{diag}(\lambda_1, \lambda_2, \ldots, \lambda_r) \in \mathbb{R}^{r \times r}$ and $H_s=[h_1 \ h_2 \ \ldots \ h_r] \in \mathbb{C}^{n_2 \times r}$. According to equation (3), $\hat{L}$ may be computed as:

$$\hat{L} = \hat{U}\hat{V}. \quad (8)$$

It should be appreciated that the Frobenius norm is not a robust cost function because it exploits the squared error. Thus, the performance of equation (7) will degrade when the probability density function (PDF) of the noise is impulsive or Q contains outliers. Accordingly, the low-rank matrix approximation implemented according to embodiments of the present invention employ the $l_p$-norm cost function with p<2 (e.g., 1≤p<2) to robustify equation (4) as:

$$\min_{U,V} f_p(U, V) := \|UV - M\|_p^p. \quad (9)$$

For 1≤p≤2, the element-wise $l_p$-norm may be defined as:

$$\|M\|_p = \left( \sum_{i=1}^{n_1} \sum_{j=1}^{n_2} |m_{i,j}|^p \right)^{1/p} \quad (10)$$

Equation (9) reduces to equation (4) at p=2, and therefore equation (9) may be said to generalize equation (4). Thus, as discussed above, the $l_p$-minimization of equation (9) with respect to U and V is a nonconvex optimization problem. However, the SVD cannot be applied except for p=2 (i.e., $l_2$-norm). Accordingly, embodiments of the invention consider the minimization, that is:

$$\min_{U,V} f(U, V) := \|UV - M\|_1 \quad (11)$$

and thus provide a $l_1$-PCA technique for low-rank matrix approximation of observed data matrices that is configured to extract the low-rank matrix or principal components from an observed data matrix with impulsive noise, outliers, and/or sparse features. This is because, compared with other values of $p \in (1, 2)$, the PCA technique with p=1 is more robust to outliers and computationally much simpler.

Where Z=UV−M, equation (9) is equivalent to the linearly constrained problem:

$$\min_{U,V,Z} \|Z\|_1, \ s.t. \ Z = UV - M. \quad (12)$$

The augmented Lagrangian of equation (12) is:
$$\mathcal{L}_\mu(U, V, Z, \Lambda) = \|Z\|_1 + Re(\langle \Lambda, UV-Z-M \rangle) + \mu/2 \|UV-Z-M\|_F^2, \quad (13)$$

where the matrix $\Lambda \in \mathbb{C}^{n_1 \times n_2}$ contains the $n_1 n_2$ Lagrange multipliers, $\langle A, B \rangle = \Sigma_i \Sigma_j a^*_{i,j} b_{i,j}$ represents the inner product of two complex-valued matrices A and B, and $\mu > 0$ is the penalty parameter. It should be appreciated that the augmented Lagrangian reduces to the unaugmented one if $\mu=0$. Furthermore, the selection of $\mu$ is flexible and may be set as a fixed positive constant, although employing a time-varying $\mu$ at each iteration may improve the convergence somewhat in practice.

The Lagrange multiplier method solves the constrained problem of equation (12) by finding a saddle point of the augmented Lagrangian:

$$\min_{U,V,Z} \max_{\Lambda} \mathcal{L}_\mu(U, V, Z, \Lambda). \quad (14)$$

Formulation (14) is a minimax problem where the primal variables {U, V, Z} and dual variable $\Lambda$ aim at decreasing and increasing $\mathcal{L}_\mu(U, V, Z, \Lambda)$, respectively. The ADMM may be used to calculate the saddle point in formulation (14). In particular, the ADMM may calculate the saddle point using the following iterative steps:

$$(U^{k+1}, V^{k+1}) = \arg\min_{U,V} \mathcal{L}_\mu(U, V, Z^k, \Lambda^k); \quad (15)$$

$$Z^{k+1} = \arg\min_{Z} \mathcal{L}_\mu(U^{k+1}, V^{k+1}, Z, \Lambda^k); \quad (16)$$

and $$\Lambda^{k+1} = \Lambda^k + \mu(U^{k+1}V^{k+1} - Z^{k+1} - M), \quad (17)$$

where $\{U^k, V^k, Z^k, \Lambda^k\}$ represent the estimation results at the kth iteration.

It should be appreciated that the gradient of $\mathcal{L}_\mu(U^{k+1}, V^{k+1}, Z^{k+1}, \Lambda)$ with respect to $\Lambda$ is:

$$\frac{\partial \mathcal{L}_\mu(U^{k+1}, V^{k+1}, Z^{k+1}, \Lambda)}{\partial \Lambda^*} = U^{k+1}V^{k+1} - Z^{k+1} - M, \quad (18)$$

wherein the Wirtinger derivative is employed in equation (18) because $\Lambda$ is complex-valued. It can be seen from the foregoing that equation (17) adopts a gradient ascent with a step size $\mu$ to update the dual variable $\Lambda$. In operation according to the above iterative steps, the ADMM updates {U, V} and Z in an alternating or sequential fashion to circumvent the difficulty in jointly minimizing with respect to the two primal blocks.

Equation (15) minimizes {U, V} simultaneously. As such, the above iterative steps employing equations (15)-(17) correspond to a two-block ADMM (i.e., the two blocks being {U, V} and Z) but not a three-block one. Thus, it should be appreciated that the ADMM implemented according to embodiments of a $l_1$-PCA technique for low-rank matrix approximation of observed data matrices does not have any divergence problems because the convergence of two-block ADMM is guaranteed, although the cases with more blocks may not necessarily be convergent.

The subproblem of equation (15) above may be reduced to an equivalent solved by the truncated SVD. For example, defining $$X^k = Z^k - \frac{\Lambda^k}{\mu} + M \qquad (19)$$

and ignoring the constant term independent on $\{U, V\}$, the subproblem of equation (15) can be seen as an equivalent to the following Frobenius norm minimization problem:

$$(U^{k+1}, V^{k+1}) = \underset{U,V}{\operatorname{argmin}} \|UV - X^k\|_F^2 \qquad (20)$$

whose global minimizer can be obtained by the truncated SVD of $X^k$. From equations (6)-(8):

$$U^{k+1} = G_s^k, \quad V^{k+1} = \Sigma_s^k (H_s^k)^H. \qquad (21)$$

where $\Sigma_s^k \in \mathbb{R}_+^{r \times r}$ is the diagonal matrix whose diagonal elements are the r dominant singular values of $X^k$, while the columns of $G_s^k \in \mathbb{C}^{n_1 \times r}$ and $H_s^k \in \mathbb{C}^{n_2 \times r}$ are the corresponding left and right singular vectors, respectively. It should be appreciated that, because the complexity of the truncated SVD is $\mathbb{R}(n_1 n_2 r)$ and the matrix rank is $r \ll \min(n_1, n_2)$, the computational cost in equation (21) is much less than that of the full SVD which requires a complexity of $\mathcal{O}(\max(n_1 n_2^2, n_1^2 n_2))$.

The subproblem of equation (16) may be simplified and expressed as:

$$\min_Z \frac{1}{2} \|Z - Y^k\|_F^2 + \frac{1}{\mu} \|Z\|_1 \qquad (22)$$

where $$Y^k = U^{k+1} V^{k+1} + \frac{\Lambda^k}{\mu} - M. \qquad (23)$$

The solution of equation (22) defines the proximity operator of the $l_1$-norm of a complex-valued matrix. Equation (22) is separable and thus may be decomposed into $n_1 n_2$ independent scalar minimization problems:

$$\min_{z_{i,j}} \frac{1}{2} |z_{i,j} - y_{i,j}^k|^2 + \frac{1}{\mu} |z_{i,j}|, \; 1 \leq i \leq n_1, \; 1 \leq j \leq n_2. \qquad (24)$$

The solution of equation (24) is the soft-thresholding operator for complex variables, which has the closed-form expression:

$$z_{i,j}^{k+1} = \frac{\max(|y_{i,j}^k| - 1/\mu, 0)}{\max(|y_{i,j}^k| - 1/\mu, 0) + 1/\mu} y_{i,j}^k. \qquad (25)$$

It should be appreciated that equation (25) generalizes the popular real-valued soft-thresholding operator. In light of the foregoing, only a marginal complexity of $\mathcal{O}(n_1 n_2)$ is needed to update Z in operation according to embodiments herein.

Reasons for the choice of p=1 with respect to the $l_p$-norm cost function in implementations of the low rank matrix approximation according to embodiments of the present invention can be appreciated from the foregoing. In particular, the proximity operator of the $l_1$-norm has a simple closed-form solution while the $l_p$-norm with p≠1 does not. Although the proximity operator of the pth power of the $l_p$-norm can be exactly solved as it is a convex problem for 1<p<2, an iterative procedure is required as there is no closed-form expression, which indicates a time-consuming and processor intensive task. Moreover, the soft-thresholding shrinks the value larger than the threshold towards to zero, and thus outlier reduction is automatically achieved. Accordingly, the $l_1$-subspace decomposition is more robust against outliers than employing 1<p<2.

FIG. 3 shows pseudocode providing logic implementing the ADMM of a $l_1$-PCA technique for low-rank matrix approximation in accordance with the foregoing. As may be seen in pseudocode logic 300 of FIG. 3, the ADMM converts the minimization of a nonsmooth $l_1$-norm into a Frobenius norm minimization at each iteration, which is then efficiently solved by the truncated SVD. It should be appreciated that the additional cost for computing the soft-thresholding operator is quite marginal because it has a simple closed-form solution. The residual:

$$R^l = U^k V^k - Z^k - M \qquad (26)$$

reflects how well the current iterate satisfies the linear constraint and can be used to check for convergence. Specifically, the iterations performed by pseudocode logic 300 of the illustrated embodiment are terminated when the normalized Frobenius norm of the residual is less than a small tolerance parameter δ>0, that is:

$$\frac{\|R^k\|_F}{\|M\|_F} < \delta. \qquad (27)$$

It should be appreciated that the dominant complexity per iteration of the ADMM implemented according to embodiments of a $l_1$-PCA technique is the truncated SVD calculation. Accordingly, the total complexity of the ADMM of an embodiment of a $l_1$-PCA technique is $\mathcal{O}(n_1 n_2 r N_{ADMM})$, where $N_{ADMM}$ is the required number of iterations in the algorithm. Typically, a value of several tens is enough for $N_{ADMM}$ to attain robust subspace factorization.

Having described concepts employed by a $l_p$-PCA technique providing the low-rank matrix approximation using low-rank matrix factorization in the $l_p$-norm space, where 1≤p<2, various exemplary $l_p$-PCA technique applications are provided below. In particular, $l_p$-PCA techniques as employed in the applications of source localization, texture impainting, and video background extraction are provided below. These exemplary $l_p$-PCA technique applications illustrate the excellent performance of the $l_p$-PCA in accordance with the concepts herein.

The convergence behavior and source localization performance in the presence of impulsive noise of a $l_p$-PCA technique may be shown using synthesized data having impulsive noise. For example, two widely used PDF models for impulsive noise, namely, Gaussian mixture (GM) and generalized Gaussian distribution (GGD), may be considered for runtime evaluation of a $l_p$-PCA technique.

For the GM PDF model, each $q_{i,j}$ is a two-term circular independent GM variable and its PDF is:

$$p_q(q) = \sum_{i=1}^{2} \frac{c_l}{\pi \sigma_l^2} \exp\left(-\frac{|q|^2}{\sigma_l^2}\right). \tag{28}$$

where $c_l \in [0, 1]$ and $\sigma_l^2$ are the probability and variance of the lth term, respectively, with $c_1+c_2=1$. If $\sigma_2^2 \gg \sigma_1^2$ and $c_2 < c_1$ are selected, large noise samples of variance $\sigma_2^2$ occurring with a smaller probability $c_2$ are the outliers embedded in Gaussian background noise of variance $\sigma_1^2$. Thus, GM models the phenomenon well in the presence of both Gaussian noise and impulsive noise. The total variance of $q_{i,j}$ is $\sigma_q^2 = c_1\sigma_1^2 + c_2\sigma_2^2$. Setting $\sigma_2^2 = 100\sigma_1^2$ and $\sigma_2 = 0.1$ gives 10% outliers in the GM model.

The PDF of the circular zero-mean GGD with variance $\sigma_q^2$ is:

$$p_q(q) = \frac{\beta \Gamma(4/\beta)}{2\pi \sigma_q^2 \Gamma^2(2/\beta)} \exp\left(-\frac{|q|^\beta}{c\sigma_q^\beta}\right), \tag{29}$$

where $\beta>0$ is the shape parameter, $\Gamma(\cdot)$ is the Gamma function, and $c=(\Gamma(2/\beta)/\Gamma(4/\beta))^{\beta/2}$. The GGD reduces to the circular Gaussian distribution at $\beta=2$. Sub-Gaussian and heavy-tailed samples are modeled by $\beta>2$ and $\beta<2$, respectively. In particular, $\beta=1$ corresponds to the Laplacian distribution. The smaller the value of $\beta$, the more impulsive the noise is. In the analysis provided herein, $\beta=0.4$ has been adopted as providing suitable impulsive noise in the GGD model.

In examining the convergence behavior of the ADMM implemented by a $l_p$-PCA technique according to the concepts herein, the ACO method is also implemented to show the comparative performance. For ACO, the objective function $f_p(U, V)$ is minimized over one factored matrix while the other factor is fixed. More specifically, at the (k+1)th (k=0, 1, . . . ) iteration, U and V are alternately minimized:

$$V^{k+1} = \underset{V}{\arg\min} \|U^k V - M\|_p^p \tag{30}$$

and $$U^{k+1} = \underset{U}{\arg\min} \|UV^{k+1} - M\|_p^p. \tag{31}$$

It should be appreciated that the minimizations in equations (30) and (31) are convex for $1 \leq p \leq 2$ and thus global convergence is guaranteed. Equation (30) is separable into $n_2$ independent $l_p$-regression subproblems:

$$\min_{v_i \in \mathbb{R}^r} \|U^k v_i - m_i\|_p^p, \ t = 1, 2, \ldots, n_2, \tag{32}$$

where $v_t$ denotes the tth column of V, which can be solved by the iteratively reweighted least squares (IRLS) algorithm with a computational complexity of $\mathcal{O}(n_1 r^2 N_{IRLS})$, where $N_{IRLS}$ is the iteration number required for the IRLS to converge. Thus, the complexity for equation (30) is $\mathcal{O}(n_1 n_2 r^2 N_{IRLS})$. Since equations (30) and (31) have the same structure, equation (31) is determined in the same manner as that set forth above with respect to equation (30), with the same complexity. As a result, the total complexity in the ACO is $\mathcal{O}(n_1 n_2 r^2 N_{IRLS} N_{ACO})$, where $N_{ACO}$ is the iteration number required for the ACO method to converge.

The noise-free matrix L of rank r may be generated by multiplying $A \in \mathbb{C}^{n_1 \times r}$ and $S \in \mathbb{C}^{r \times n_2}$ whose entries satisfy the standard circular Gaussian distribution. The independent GM noise of variance $\sigma_q^2$ may be added to all elements of L to produce the observed data matrix M=L+Q. The signal-to-noise ratio (SNR) may be defined as $$SNR = \frac{\|L\|_F^2}{n_1 n_2 \sigma_q^2}, \tag{33}$$

where $\|L\|_F^2/(n_1 n_2)$ represents the average signal power. For fair comparison, both ADMM and ACO algorithms apply the same initialization and p=1 is employed in the latter. In the example herein, $n_1=20$, $n_2=50$, r=4 and SNR=6 dB are assigned. The values of the objective functions up to the computer round-off precision of the ADMM and ACO schemes are obtained using finite iterations, which are denoted as $f^*_{ADMM}$ and $f^*_{ACO}$, respectively.

Figure 4:
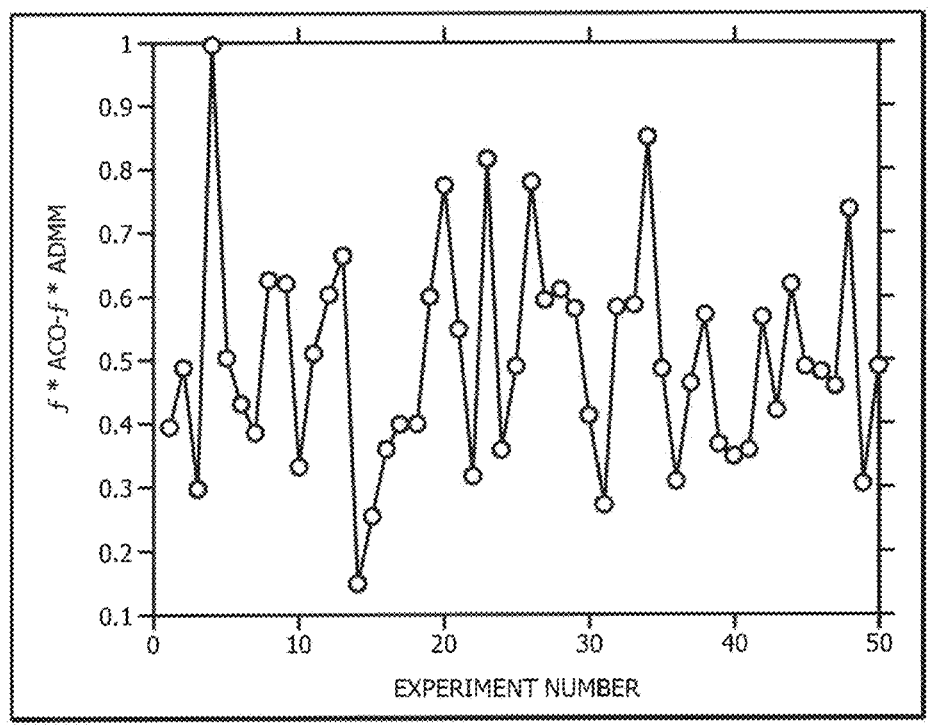
FIG. 4 shows a graph of the difference in a conventional ACO objective function and an ADMM objective function according to embodiments of the invention.

FIG. 4 shows the difference in ACO and ADMM objective functions, namely, $f^*_{ACO} - f^*_{ADMM}$, for 50 independent runs. It should be appreciated that all differences are positive, indicating that $f^*_{ADMM} < f^*_{ACO}$ and that both converge to different points. That is, the ACO scheme yields inferior solutions while the ADMM scheme converges to a better point with a smaller objective function value.

Figure 5:
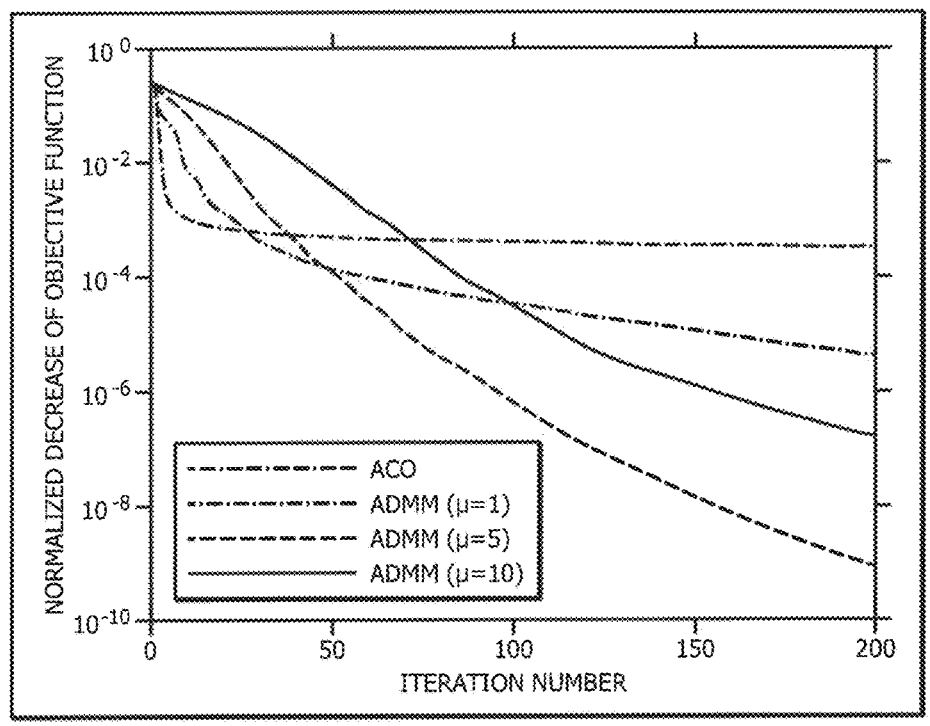
FIG. 5 shows graphs of normalized decrease of objective function versus iteration number for a conventional ACO scheme and ADMM schemes according to embodiments of the invention.
Figure 6:
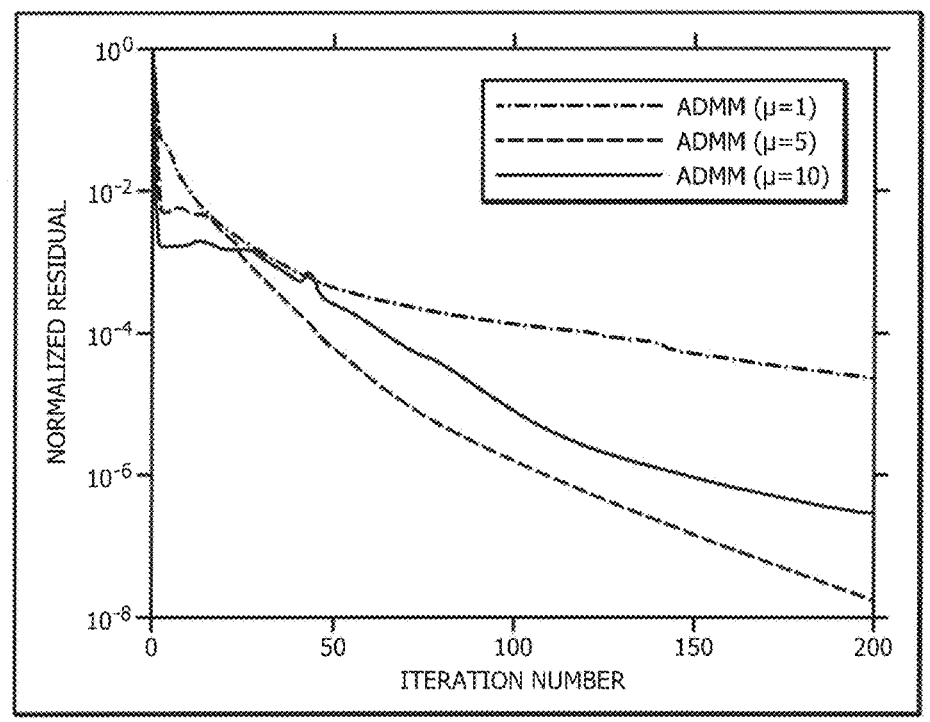
FIG. 6 shows graphs of normalized residual of ADMM versus iteration number in accordance with embodiments of the invention.
Figure 7:
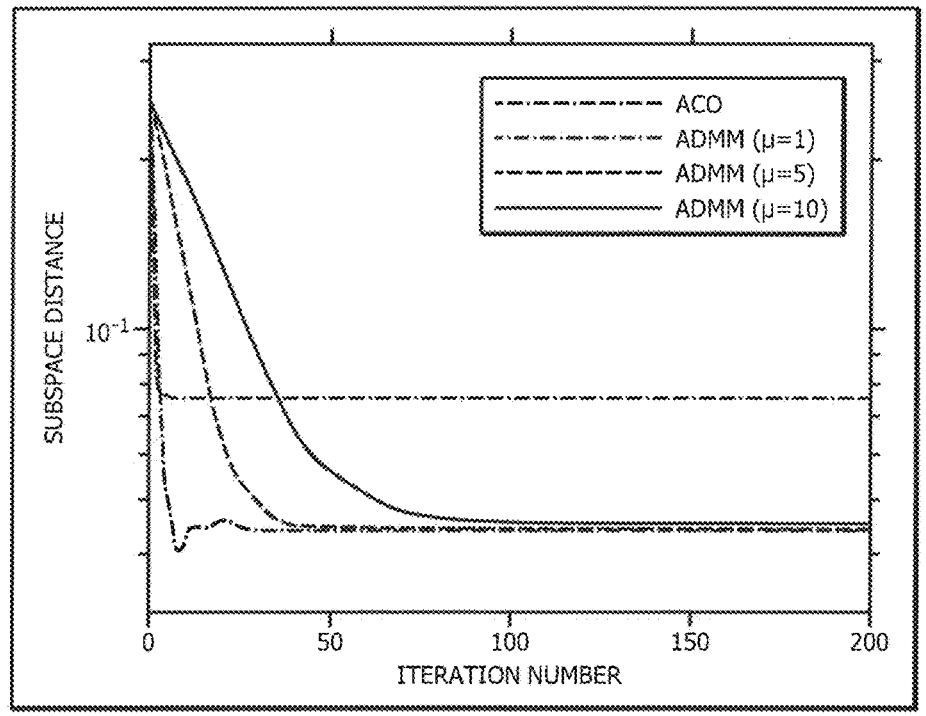
FIG. 7 shows graphs of subspace distance versus iteration number for a conventional ACO scheme and ADMM schemes according to embodiments of the invention.

FIG. 5 compares the normalized decrease of the ACO and ADMM objective functions, namely, $|f(U^k, V^k) - f^*|/f(U^0, V^0)$ where $f^*$ is the global minimum. In the comparison of FIG. 5, three values of μ, 1, 5 and 10 are employed for the ADMM scheme. It should be appreciated that $f^*$ is very difficult to obtain and $f^*_{ADMM}$ has been used in the example instead. As discussed above, $f^*_{ADMM}$ is calculated up to the computer round-off precision using finite iterations in advance. FIG. 6 shows the normalized Frobenius norm of the residual in the ADMM scheme, namely, $\|R^k\|_F/\|M\|_F$, versus iteration number. It is expected that the estimated signal subspace $\hat{U}$ spans the same range space of A. The normalized subspace distance between $\hat{U}$ and A is taken as the performance measure to evaluate the quality of the subspace estimate, which is defined as:

$$SD(\hat{U}, A) = \frac{\|\Pi_U - \Pi_A\|_F}{\|\Pi_A\|_F}, \tag{34}$$

where $\Pi_A = A(A^H A)^{-1} A^H$ is the projection matrix onto the column space of A. A smaller value of $SD(\hat{U}, A)$ indicates a more accurate estimate of U. In the ideal case when $\hat{U}$ and A span the same column space, the subspace distance is zero. FIG. 7 compares the subspace distance versus iteration number and it should be appreciated that global convergence is not guaranteed for both algorithms. It can be seen that the ACO scheme is inferior to the ADMM scheme as the ACO scheme has larger objective function value and subspace distance, although it has a rapid decreasing rate at the initial stage.

It can be seen from FIGS. 5-7 that the ADMM scheme with different values of µ converges to the same solution in the steady state although the convergence rates differ. That is, the penalty parameter µ only affects the convergence speed. The value of µ=1 corresponds to the fastest rate at the transient but it slows down later, implying that the selection of µ is quite flexible.

It can be seen from FIG. 6 that several tens of iterations are employed for the ADMM scheme to attain a normalized residual of $10^{31\ 3}$ to $10^{-4}$. This order-of-magnitude of iterations is also enough for the convergence of subspace distance, as may be seen in FIG. 7.

To compare the implementation complexity, the runtimes of the ADMM and ACO schemes have been measured using MATLAB on a computer with a 3.2 GHz CPU and 4 GB memory. The simulation settings remain unchanged except that $n_1$ and $n_2$ vary. The CPU times (in seconds) with different sets of $n_1$ and $n_2$, which are based on an average of 20 independent runs, are listed in the table below. The stopping parameter used in the ADMM simulations is $\delta=10^{-3}$. This value is also used as the tolerance for the ACO simulations (i.e., the ACO terminates when the relative change of the objective function is less than $10^{-3}$). It can be seen from the results represented in the table below that the ADMM scheme is more computationally efficient than the ACO scheme, particularly for larger scale problems. Combining the results in FIGS. 4-7, it can be appreciated that the ADMM scheme is superior to the ACO scheme in terms of robust subspace estimation performance and computational complexity.

|  | $n_1 = 20$<br>$n_2 = 50$ | $n_1 = 40$<br>$n_2 = 100$ | $n_1 = 80$<br>$n_2 = 200$ | $n_1 = 200$<br>$n_2 = 500$ | $n_1 = 1000$<br>$n_2 = 2000$ |
|---|---|---|---|---|---|
| ADMM | $1.37 \times 10^{-1}$ | $3.21 \times 10^{-1}$ | $6.52 \times 10^{-1}$ | $3.05 \times 10^{0}$ | $1.06 \times 10^{2}$ |
| ACO | $1.10 \times 10^{1}$ | $2.78 \times 10^{1}$ | $1.15 \times 10^{2}$ | $1.25 \times 10^{3}$ | $1.28 \times 10^{5}$ |

In addition to the aforementioned advantages of $l_p$-PCA techniques, a $l_p$-PCA technique implemented in accordance with the concepts herein provides robust direction-of-arrival (DOA) estimation. Target localization using measurements from an array of spatially separated sensors has been one of the central problems in numerous application areas including radar, sonar, global positioning system, wireless communications, multimedia, and sensor network. The positions of the targets can be represented by their directions-of-arrival (DOAs). The subspace based DOA estimation approach is a standard choice among many DOA estimators because it strikes a good balance between estimation accuracy and computational complexity. The underlying idea of such a subspace methodology is to separate the data into signal and noise subspaces. It is usually achieved by SVD of the observed data matrix or eigenvalue decomposition (EVD) of the sample covariance matrix, and the parameters of interest are then extracted from the corresponding eigenvectors, singular vectors, eigenvalues or singular values.

In an example comprising a uniform linear array (ULA) of m sensors with inter-element spacing d, the ULA receives r far-field and narrowband sources emitting plane waves. Where the first sensor is assigned as the reference, the complex baseband signal received by the ith (i=1, 2, ..., m) sensor may be modeled as:

$$y_i(t) = \sum_{j=1}^{r} s_j(t) e^{i2\pi(i-1)\sin(\theta_j)d/\eta} + \xi_i(t), \quad (35)$$

where $$i = \sqrt{-1},$$

t is the discrete-time index, $s_j(t)$ is the jth (j=1, 2, ..., r) source signal with $\theta_j$ being its DOA, $\xi_i(t)$ is the additive non-Gaussian noise at the ith sensor, and $\eta$ is the wavelength of the signal. To avoid the phase ambiguity $d \leq \eta/2$ is used in this example. According to commonly used assumptions, the number of sources is less than the number of sensors, namely, r<m, r is known, and the zero-mean sources are mutually independently with each other, while the noises $\{\xi_i(t)\}_{i=1}^{m}$ are spatially uncorrelated and temporally white, and statistically independent of the sources.

Stacking the output of all the sensors in a vector $y_t=[y_1(t)\ y_2(t)\ \ldots\ y_m(t)]^T \in \mathbb{C}^m$, the matrix-vector formulation of equation (35) is then:

$$y_t = As_t + \xi_t, \quad (36)$$

where $s_t=[s_1(t)\ s_2(t)\ \ldots\ s_r(t)]^T \in \mathbb{C}^r$ is the source vector, $\xi_t=[\xi_1(t)\ \xi_2(t)\ \ldots\ \xi_m(t)]^T \in \mathbb{C}^m$ is the noise vector, and $A \in \mathbb{C}^{m \times r}$ is the array manifold matrix. The array manifold matrix has the following form:

$$A=[a(\theta_1), a(\theta_2) \ldots a(\theta_r)], \quad (37)$$

with $a(\theta)$ being the steering vector:

$$a(\theta)=[1\ e^{i2\pi\sin(\theta)d/\eta} \ldots e^{i2\pi(m-1)\sin(\theta)d/\eta}]^T. \quad (38)$$

In subspace based DOA estimation, the DOAs of the r sources may be estimated based on n snapshots. The n snapshots may be collected in the following matrix Y:

$$Y \triangleq [y_1\ y_2\ \ldots\ y_n]=AS+\Xi \in \mathbb{C}^{m \times n}. \quad (39)$$

where $S=[s_1\ s_2\ \ldots\ s_n] \in \mathbb{C}^{r \times n}$ and $\Xi=[\xi_1\ \xi_2\ \ldots\ \xi_n] \in \mathbb{C}^{m \times n}$ are the source and noise data matrices, respectively. The A is of full column rank and S is of full row rank. In the noiseless case of $\Xi=0$, rank(Y)=r<m due to rank(A)=rank(S)=r. As a result, an accurate estimate of AS is given by the truncated SVD according to equations (6)-(8):

$$\hat{Y}=\hat{U}\hat{V},\ \hat{U}=G_s,\ \hat{V}=\Sigma_s H_s^H \quad (40)$$

It should be appreciated that, in array processing, the range space spanned by $G_s=[g_1\ g_2\ \ldots\ g_r] \in \mathbb{C}^{m \times r}$ is called the signal subspace while its orthogonal complement, denoted by $G_n \in \mathbb{C}^{m \times (m-r)}$, is referred to as the noise subspace. The projections onto the signal and noise subspaces are related by $G_n G_n^H = I - G_s G_s^H$ where I is the identity matrix. DOA estimation can be performed using either the signal or noise subspace. Applying the multiple signal classification (MUSIC) subspace based method, the DOA estimates are given by the r peaks of the following spatial spectrum:

$$P_{MUSIC}(\theta) = \frac{1}{a^H(\theta)(I - \hat{U}\hat{U}^H)a(\theta)}, \quad (41)$$

which is based on the fact that the steering vectors of the r sources are orthogonal to the noise subspace. It should be understood, however, that other subspace approaches, including the estimation of signal parameters via rotational invariance techniques (ESPRIT) and principal-singular-vector utilization modal analysis (PUMA), can also be applied after $\hat{U}$ is obtained.

In the presence of impulsive non-Gaussian $\Xi$, a $l_p$-PCA technique implemented in accordance with the concepts herein may be employed to provide robust subspace factorization for computing $\hat{U}$. In the simulations of the example herein, in addition to the ADMM scheme of embodiments of a $l_p$-PCA technique, the results of the $l_1$-MUSIC based on ACO, conventional MUSIC, fractional low-order moment MUSIC (FLOM), robust covariance based MUSIC (ROC), zero-memory non-linearity (ZMNL), and MM methods, as well as the Cramér-Rao bound (CRB) are also provided. The ADMM and ACO algorithms directly find a robust estimated subspace while the others robustly estimate the covariance and then employ the SVD or EVD to compute the subspace. Prior to applying the MUSIC, the ZMNL method uses a Gaussian-tailed ZMNL function to clip outliers. In the MM method, the covariance matrix is first robustified via MM estimation and then MUSIC is exploited for DOA estimation, while the FLOM and ROC algorithms adopt the fractional lower-order moments in the sample covariance computation. For the purpose of fair comparison, p=1 is set as the lower order in the FLOM and ROC schemes, which align with the ADMM and ACO methods. A ULA with inter-sensor spacing being half a wavelength is considered. The CRB for the DOAs $\theta=[\theta_1 \ \theta_2 \ \ldots \ \theta_r]^T$ under non-Gaussian noise is given by:

$$CRB(\theta) = \frac{1}{I_c} \text{diag}\left\{ \sum_{i=1}^{n} \text{Re}\left( S_i^H B^H(\theta) \prod_A^{\perp} B(\theta) S_i \right) \right\}, \quad (42)$$

where $S_i=\text{diag}(s_1(t), s_2(t), \ldots, s_r(t))$ is a diagonal matrix, $B(\theta)=[b(\theta_1) \ b(\theta_2) \ \ldots \ b(\theta_r)]$ with $b(\theta)=da(\theta)/d\theta$, $\Pi_A^{\perp}=I-\Pi_A$ is the projection onto the orthogonal complementary space of A, and $$I_c = \pi \int_0^{\infty} \frac{(p'_\xi(\rho))^2}{p_\xi(\rho)} \rho d\rho \quad (43)$$

with $\rho=\|\xi\|$ being the modulus of the complex variable $\xi$ and $p'_\xi(\rho)$ the derivative of $p_\xi(\rho)$. The PDF of the noise affects the CRB only through the scalar $I_c$. The CRBs in the presence of GM and GGD noises may be numerically computed using equations (42) and (43).

Figure 8:
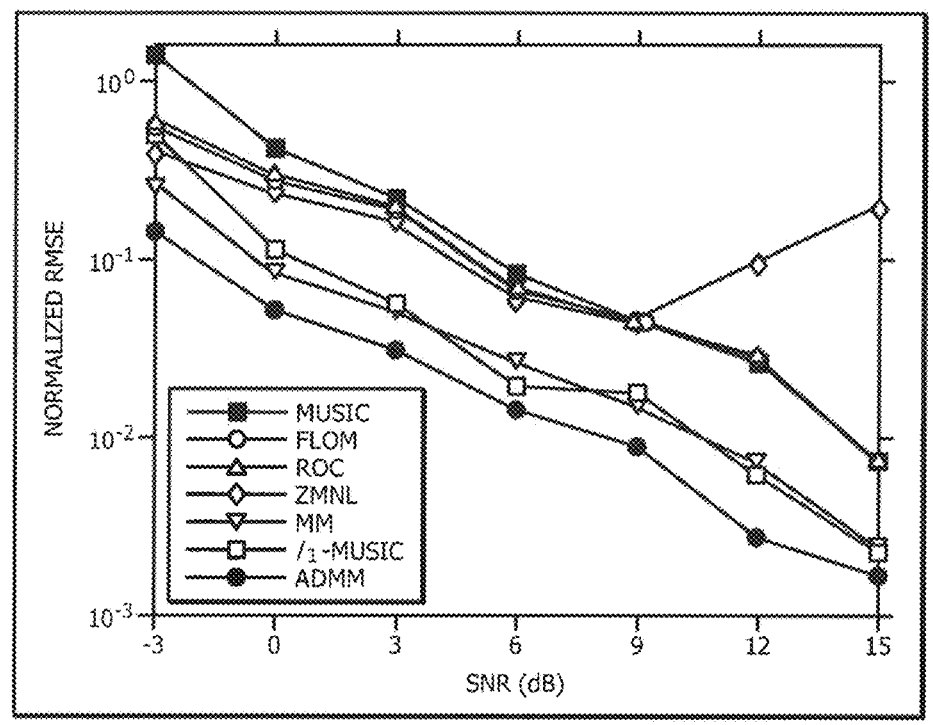
FIG. 8 shows graphs of root mean square error (RMSE) of subspace distance versus signal-to-noise ratio (SNR) for Gaussian mixture (GM) noise for various conventional schemes and an ADMM scheme according to embodiments of the invention.
Figure 9:
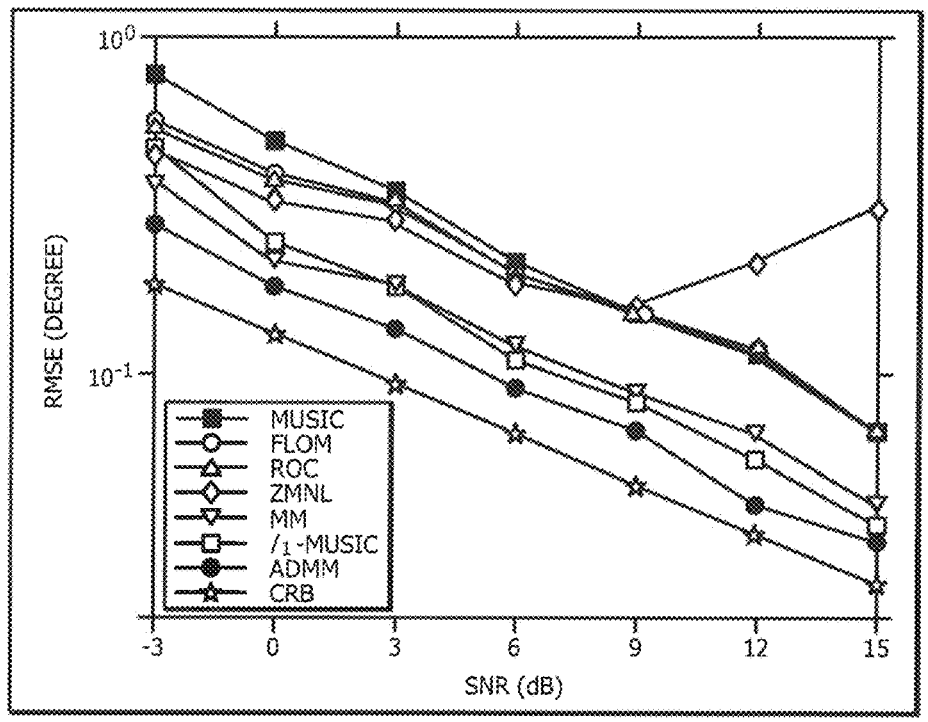
FIG. 9 shows graphs of RMSE of direction-of-arrival (DOA) of first source versus SNR for GM noise for various conventional schemes and an ADMM scheme according to embodiments of the invention.
Figure 10:
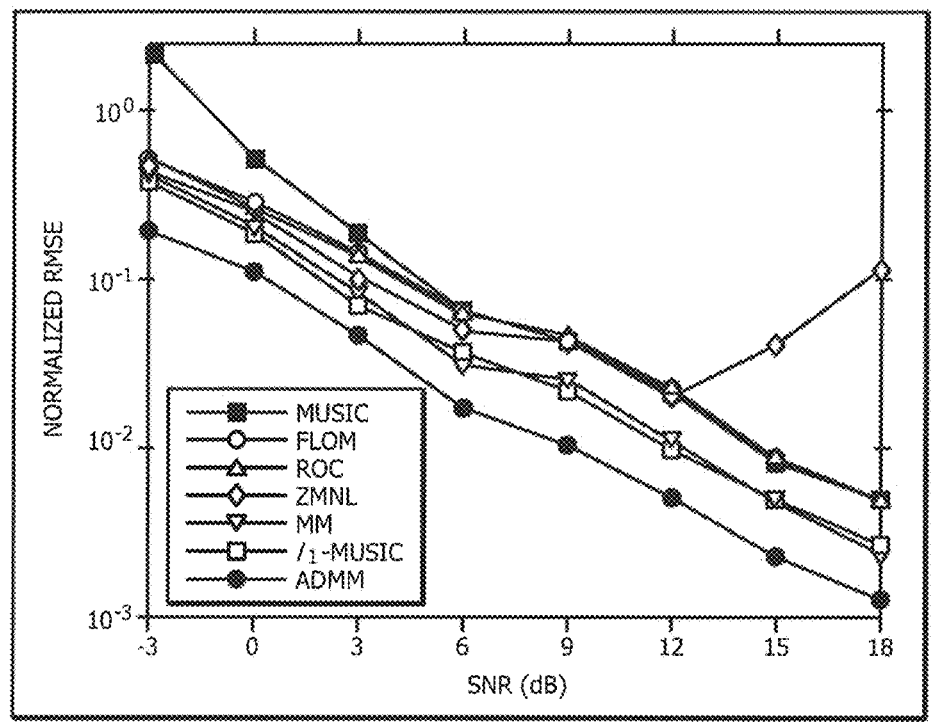
FIG. 10 shows graphs of RMSE of subspace distance versus SNR for GGD noise for various conventional schemes and an ADMM scheme according to embodiments of the invention.
Figure 11:
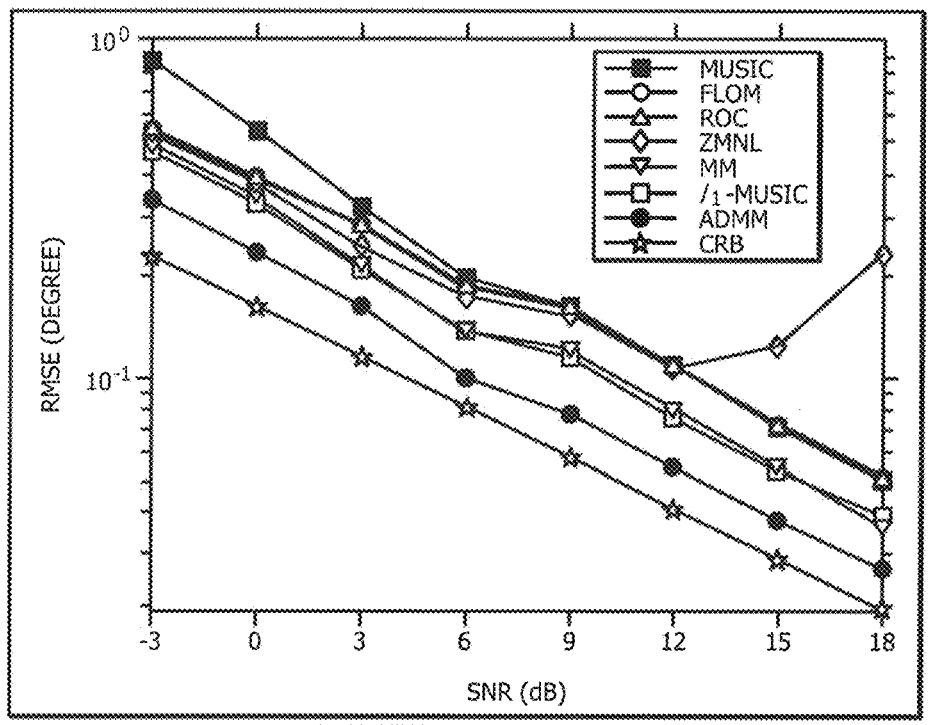
FIG. 11 shows graphs of RMSE of DOA of first source versus SNR for generalized Gaussian distribution (GGD) noise for various conventional schemes and an ADMM scheme according to embodiments of the invention.

Monte Carlo trials have been carried out to evaluate the performance of the DOA estimators. The root mean square errors (RMSEs) of the subspace distance and DOAs are taken as the performance measures, which are defined as $$RMSE(\hat{U}) = \frac{1}{\|\Pi\|_{A_F}} \sqrt{\frac{1}{N} \sum_{i=1}^{N} \|\Pi_{\hat{U}^i} - \Pi_A\|_F^2} \quad (44)$$

and $$RMSE(\hat{\theta}_j) = \sqrt{\frac{1}{N} \sum_{i=1}^{N} (\hat{\theta}_j^i - \theta_j)^2}, \ j=1, 2, \ldots, r, \quad (45)$$

where N is the number of Monte Carlo trials, $\tilde{U}^i$ and $\tilde{\theta}_j^i$ are the estimated subspace and DOA of the jth source in the ith trial, respectively. The root-MUSIC is employed to calculate the DOA parameters after the signal subspace is determined to avoid grid search over the spectrum. In the example, the emitting sources are two independent quadrature phase-shift keying (QPSK) signals with equal power with DOAs $\theta_1=-8°$ and $\theta_2=10°$. This means that the target rank is r=2. The numbers of sensors and snapshots are m=6 and n=100, while N=200. FIGS. 8 and 9 show the RMSEs of subspace distance and DOA estimate for $\theta_1$ versus SNR in GM noise, respectively. FIGS. 10 and 11 show the results for GGD noise. As the performance for $\theta_2$ is similar, the corresponding RMSEs are not shown.

It can be seen from FIGS. 8-11 that the conventional MUSIC scheme is not robust in the presence of impulsive noise. In contrast, as can also be seen from FIGS. 8-11, the ADMM scheme has the best performance, and is superior to the $l_1$-MUSIC scheme. It should be understood that the $l_1$-MUSIC method produces smaller RMSEs because it uses multiple random initializations and the best result is selected. However, using multiple initializations requires running the ACO many times. For fair comparison, all the methods employ the same initial value. MM and ZMNL methods also show good robustness to outliers but the latter suffers performance saturation as SNR increases. This is because it generally destroys the low-rank structure of the signal subspace, which leads to a performance saturation or even degradation. Although the FLOM and ROC methods outperform the conventional MUSIC algorithm, they are inferior to the ADMM, $l_1$-MUSIC, MM, and ZMNL schemes.

The following example of a $l_p$-PCA technique employed in the application of texture impainting illustrates results using real-world data. It should be appreciated that many natural and man-made images include highly regular textures, corresponding to low-rank matrices. In texture impainting, the task is to recover the background texture which is sparsely occluded by untextured components. That is, for the observed image (e.g., provided as an observed data matrix), textured and untextured components may be modeled as M, L and Q in equation (2), respectively.

In the example herein, the ADMM scheme of a $l_p$-PCA technique of embodiments with r=2 is applied to an image of a chessboard with 377×370 pixels (shown in FIG. 12A). The results of operation of the $l_p$-PCA technique are shown in FIGS. 12B and 12C, wherein FIG. 12B shows the recovered background texture (low-rank component) and FIG. 12C shows the recovered untextured components (sparse component). It can be seen from FIGS. 12A-12C that the ADMM scheme flawlessly recovers the checkerboard from the pieces. It should be appreciated from the foregoing that the $l_p$-PCA technique of embodiments directly applies to the real-valued observations because real number is merely a special case of complex number.

The following examples of a $l_p$-PCA technique employed in the application of video background extraction further illustrate results using real-world data. In this application, the background scene is extracted from a number of video frames. Converting each frame of a video as a column of a matrix, the resultant matrix is of low-rank intrinsically due to the correlation between frames. In the presence of foreground objects especially in busy scenes, every frame may contain some anomalies. Accordingly, the background may be modeled as approximately low rank (e.g., the background is L and foreground is Q according to the model of equation (2)). Foreground objects such as moving cars or walking pedestrians, generally occupy only a fraction of the image pixels, and thus may be treated as sparse outliers. If the background is invariant, the rank may be set as r=1. Otherwise the rank may be selected slightly larger than one to accommodate small changes in the background. That is.

Figure 13A:
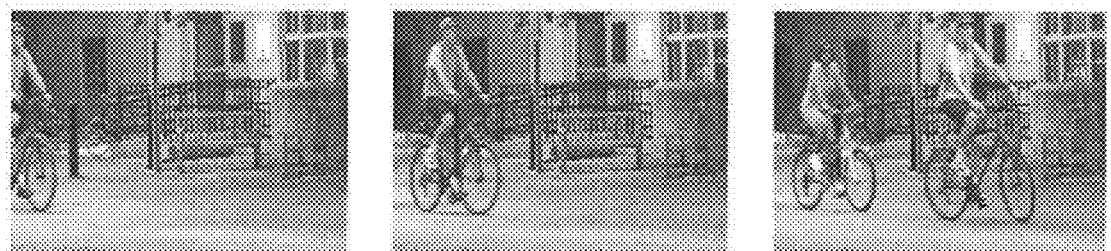
FIGS. 13A-13C and 14A-14C show results $l_p$-PCA techniques employed in the application of video background extraction.
Figure 13B:
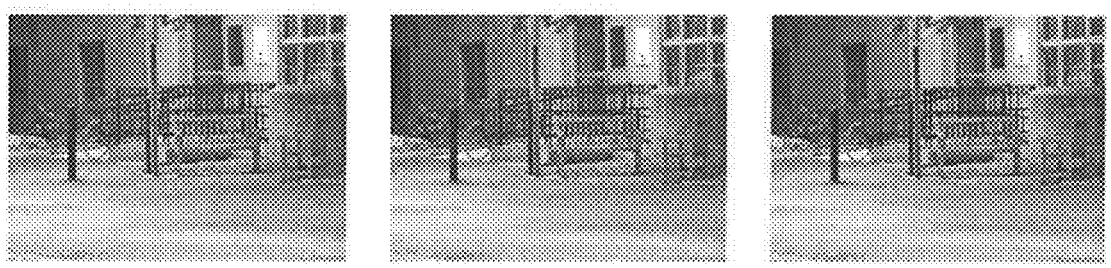
Figure 13C:
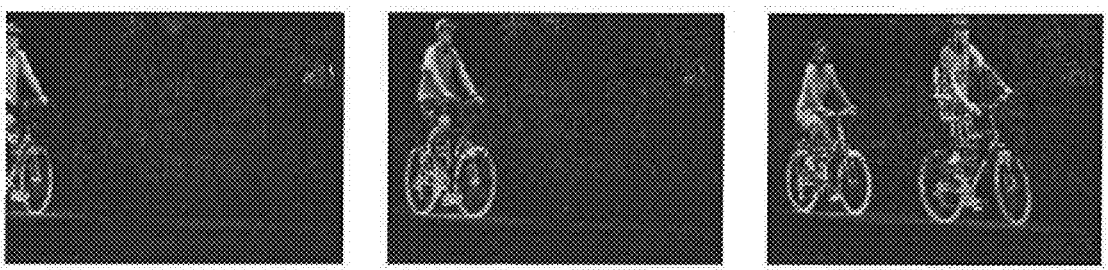
Figure 14A:
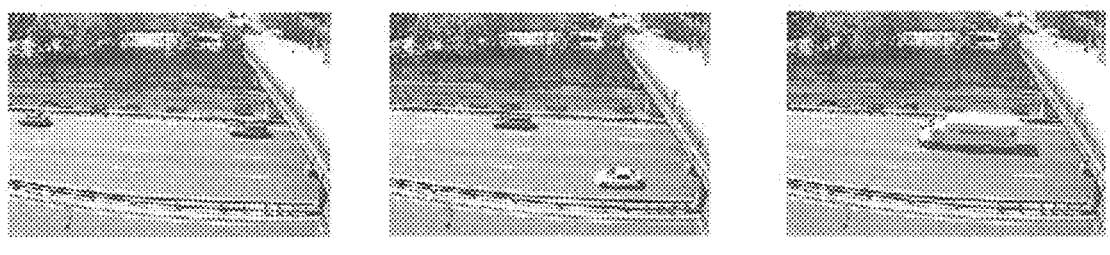
Figure 14B:
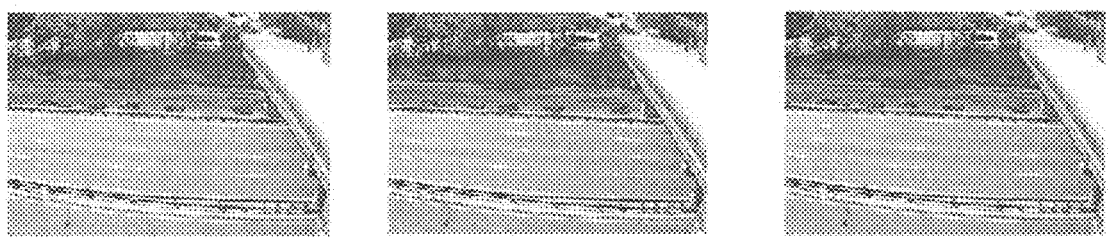
Figure 14C:
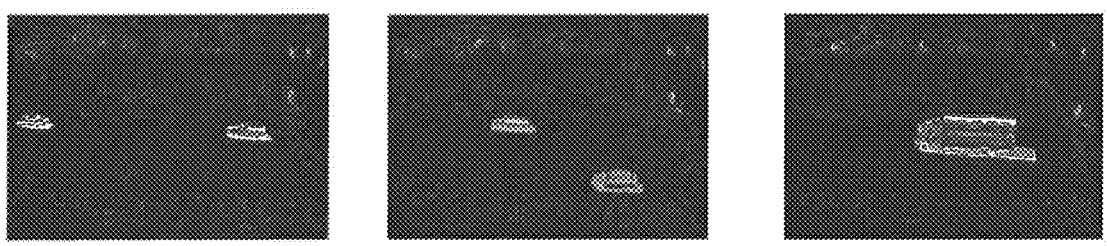

The examples of video background extraction herein consider two video datasets available from CDNET. In particular, the video datasets of the examples are "backdoor" comprising a video sample of 2000 color frames with prevalent hard and soft shadow intermittent shades and "streetlight" comprising a video sample of 3200 color frames containing background objects stopping for a short while and then moving away. In the examples herein, for both datasets, the first 200 frames of the video samples were selected and converted to grayscale versions, as represented in FIGS. 13A and 14A, respectively. All frames of these examples have a size of 240×320, corresponding to 76800 pixels. Thus, the observed data matrix constructed from each video is $M \in \mathbb{R}^{76800 \times 200}$ where $n_1=76800$ and $n_2=200$. As the two videos have relatively static backgrounds, r=1 is selected in both cases. FIGS. 13B and 13C and 14B and 14C show the results of three representative frames in the "backdoor" and "streetLight" datasets, respectively. It can be seen from these representative frames the ADMM scheme successfully separates the background from the foreground.

The foregoing examples demonstrate that the ADMM scheme of a $l_p$-PCA technique of embodiments successfully extracts the low-rank components in challenging applications. In particular, the example applications demonstrate robust signal subspace estimation which leads to accurate source localization in the presence of impulsive noise, separation of the textured image from the untextured components in texture impainting, and separation of background from foreground in video frames where the former and latter are modelled as low-rank matrix and sparse matrix, respectively.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for low-rank approximation of an observed data matrix, the method comprising:
    obtaining, by a processor-based system, the observed data matrix;
    performing, by logic of the processor-based system, factorization of the observed data matrix in $l_p$-norm space, wherein p<2; and
    providing, by the processor-based system from a result of the $l_p$-norm space factorization of the observed data matrix, a low-rank approximation comprising principal components extracted from the observed data matrix.

2. The method of claim 1, wherein obtaining the observed data matrix comprises:
    deriving the observed data matrix from a signal selected from the group consisting of a data signal, a graphical signal, an audio signal, a video signal, and a multimedia signal, wherein the observed data matrix comprises a matrix of a plurality of data points representing the signal.

3. The method of claim 2, wherein providing the low-rank approximation comprises:
    providing the low-rank approximation for use at least one application selected from the group consisting of a surveillance application, a machine learning application, a web search application, a bioinformatics application, a dimensionality reduction application, and a signal processing application.

4. The method of claim 1, wherein the observed data matrix comprises presence of at least one of impulsive noise, outliers, or sparse features.

5. The method of claim 1, wherein $1 \leq p < 2$.

6. The method of claim 5, wherein performing the factorization of the observed data matrix in the $l_p$-norm space comprises:
    performing factorization of the observed data matrix in $l_1$-norm space, wherein p=1.

7. The method of claim 1, wherein performing the factorization of the observed data matrix in the $l_p$-norm space comprises:
    applying alternating direction method of multipliers (ADMM) to solve subspace decomposition of low-rank matrix factorization with respect to the observed data matrix.

8. The method of claim 7, wherein applying the ADMM to solve subspace decomposition of low-rank matrix factorization comprises:
    minimizing a residual matrix in a subspace factorization of the observed data matrix.

9. The method of claim 7, wherein applying the ADMM to solve subspace decomposition of low-rank matrix factorization comprises:
    solving a $l_2$-subspace decomposition; and
    calculating a proximity operator of the $l_p$-norm.

10. The method of claim 9, wherein solving the $l_2$-subspace decomposition comprises:
    using least Frobenius norm solved by truncated singular value decomposition (SVD).

11. The method of claim 9, wherein calculating the proximity operator of the $l_p$-norm comprises:
    using a closed-form soft-thresholding operator for complex variables.

12. The method of claim 9, wherein solving the $l_2$-subspace decomposition and calculating to proximity operator of the $l_p$-norm are performed in each iterative step of the ADMM.

13. A system for low-rank approximation of an observed data matrix, the system comprising:
    one or more data processors; and
    one or more non-transitory computer-readable storage media containing program code configured to cause the one or more data processors to perform operations including:
        obtain the observed data matrix;
        perform factorization of the observed data matrix in $l_p$-norm space, wherein p<2; and
        provide, from a result of the $l_p$-norm space factorization of the observed data matrix, a low-rank approximation comprising principal components extracted from the observed data matrix.

14. The system of claim 13, wherein the program code configured to cause the one or more data processors to obtain the observed data matrix further causes the one or more data processors to:
derive the observed data matrix from a signal selected from the group consisting of a data signal, a graphical signal, an audio signal, a video signal, and a multimedia signal, wherein the observed data matrix comprises a matrix of a plurality of data points representing the signal.

15. The system of claim 14, wherein the program code configured to cause the one or more data processors to provide the low-rank approximation further causes the one or more data processors to:
provide the low-rank approximation for use at least one application selected from the group consisting of a surveillance application, a machine learning application, a web search application, a bioinformatics application, a dimensionality reduction application, and a signal processing application.

16. The system of claim 13, wherein the observed data matrix comprises presence of at least one of impulsive noise, outliers, or sparse features.

17. The system of claim 13, wherein the program code configured to cause the one or more data processors to perform the factorization of the observed data matrix in the $l_p$-norm space further causes the one or more data processors to:
perform factorization of the observed data matrix in $l_1$-norm space, wherein p=1.

18. The system of claim 13, wherein the program code configured to cause the one or more data processors to perform the factorization of the observed data matrix in the $l_p$-norm space further causes the one or more data processors to:
apply alternating direction method of multipliers (ADMM) to solve subspace decomposition of low-rank matrix factorization with respect to the observed data matrix.

19. The system of claim 18, wherein the program code configured to cause the one or more data processors to apply the ADMM to solve subspace decomposition of low-rank matrix factorization further causes the one or more data processors to:
minimize a residual matrix in a subspace factorization of the observed data matrix.

20. The system of claim 18, wherein the program code configured to cause the one or more data processors to apply the ADMM to solve subspace decomposition of low-rank matrix factorization further causes the one or more data processors to:
solve a $l_2$-subspace decomposition; and
calculate a proximity operator of the $l_p$-norm.

21. The system of claim 20, wherein the program code configured to cause the one or more data processors to solve the $l_2$-subspace decomposition further causes the one or more data processors to:
use least Frobenius norm solved by truncated singular value decomposition (SVD).

22. The system of claim 20, wherein the program code configured to cause the one or more data processors to calculate the proximity operator of the $l_p$-norm further causes the one or more data processors to:
use a closed-form soft-thresholding operator for complex variables.

23. A method for low-rank approximation of an observed data matrix, the method comprising:
obtaining, by a processor-based system, the observed data matrix;
performing, by logic of the processor-based system, factorization of the observed data matrix in $l_1$-norm space by applying alternating direction method of multipliers (ADMM) to solve subspace decomposition of low-rank matrix factorization with respect to the observed data matrix; and
providing, by the processor-based system from a result of the $l_1$-norm space factorization of the observed data matrix, a low-rank approximation comprising principal components extracted from the observed data matrix.

24. The method of claim 23, wherein applying the ADMM to solve subspace decomposition of low-rank matrix factorization comprises:
minimizing a residual matrix in a subspace factorization of the observed data matrix.

25. The method of claim 23, wherein applying the ADMM to solve subspace decomposition of low-rank matrix factorization comprises:
performing iterative steps of the ADMM, wherein each iterative step of the ADMM includes:
solving a $l_2$-subspace decomposition using least Frobenius norm solved by truncated singular value decomposition (SVD); and
calculating a proximity operator of the $l_p$-norm using a closed-form soft-thresholding operator for complex variables.

* * * * *

UNITED STATES PATENT AND TRADEMARK OFFICE
CERTIFICATE OF CORRECTION

PATENT NO.         : 10,229,092 B2
APPLICATION NO.    : 15/676600
DATED              : March 12, 2019
INVENTOR(S)        : Wen-Jun Zeng et al.

It is certified that error appears in the above-identified patent and that said Letters Patent is hereby corrected as shown below:

In the Specification

At Column 5, Line number 66, delete "as intranet" and replace with --an intranet--.
At Column 7, Line number 46, delete "variables at" and replace with --variables, at--.
At Column 8, Line number 37, delete the portion of the equation reading "$n_n \times n_2$" and replace with --$n_1 \times n_2$--.
At Column 8, Line number 38, Equation 2, delete "M=L=Q" and replace with --M=L+Q--.
At Column 9, Line number 16, delete "C" and replace with --$\mathbb{R}$--.
At Column 9, Line number 38, Equation 9, delete the portion of the equation reading "$f_\mu$" and replace with --$f_p$--.
At Column 9, Line number 55, delete "the minimization" and replace with --the $l_1$-minimization--.
At Column 10, Line number 9, Equation 13, delete the portion of the equation reading "$|Z|_1$" and replace with --$\|Z\|_1$--.
At Column 11, Line number 15, delete "can he seen" and replace with --can be seen--.
At Column 11, Line number 31, delete "$\mathbb{R}$" and replace with --$\mathcal{O}$--.
At Column 12, Line number 32, Equation 26, delete the portion of the equation reading "$R^l$" and replace with --$R^k$--.
At Column 13, Line number 8, Equation 28, delete the portion of the equation reading "i=1" and replace with --$l$=1--.
At Column 13, Line number 19, delete "σ₂=0.1" and replace with --$c_2$=0.1--.
At Column 13, Line number 63, Equation 32, delete the portion of the equation reading "$\min_{v_i \in \mathfrak{R}^r} \|U^k v_i - m_i\|$" and replace with --$\min_{v_t \in \mathfrak{R}^r} \|U^k v_t - m_t\|$--.
At Column 14, Line number 55, Equation 34, delete the portion of the equation reading "$\frac{\|\Gamma_U - \Gamma_A\|_F}{\|\Gamma_A\|_F}$" and replace with --$\frac{\|\Pi_{\hat{U}} - \Pi_A\|_F}{\|\Pi_A\|_F}$--.
At Column 15, Line number 13, delete "$10^{31\ 3}$" and replace with --$10^{-3}$--.
At Column 16, Line number 26, Equation 36, delete the portion of the equation reading "$\xi_i$" and replace with --$\xi_t$--.

Signed and Sealed this
Sixteenth Day of July, 2019

Andrei Iancu
*Director of the United States Patent and Trademark Office*

CERTIFICATE OF CORRECTION (continued)
U.S. Pat. No. 10,229,092 B2

At Column 16, Line number 34, Equation 38, delete both portions of the equation reading "$e^{i2\pi}$" and replace with --$e^{i2\pi}$--.

At Column 16, Line number 46, Equation 40, delete the portion of the equation reading "$\hat{Y} = \tilde{U}\tilde{V}$" and replace with --$\hat{Y} = \hat{U}\hat{V}$--.

At Column 17, Line number 34, delete "$S_i$" and replace with --$S_t$--.

At Column 18, Line number 1, delete "$\tilde{U}^i \text{ and } \tilde{\theta}^i_j$" and replace with --$\hat{U}^i \text{ and } \hat{\theta}^i_j$--.